US008953188B2

(12) United States Patent
Aoyagi

(10) Patent No.: US 8,953,188 B2
(45) Date of Patent: Feb. 10, 2015

(54) IMAGE PROCESSING APPARATUS AND CONTROL METHOD FOR DETECTING HEAT SOURCE USING PYROELECTRIC SENSOR

(71) Applicant: Canon Kabushiki Kaisha, Tokyo (JP)

(72) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/192,060

(22) Filed: Feb. 27, 2014

(65) Prior Publication Data

US 2014/0253938 A1 Sep. 11, 2014

(30) Foreign Application Priority Data

Mar. 8, 2013 (JP) ................................ 2013-047136

(51) Int. Cl.
*G06F 3/12* (2006.01)
*H04N 1/00* (2006.01)
*G06K 15/00* (2006.01)

(52) U.S. Cl.
CPC ........ *H04N 1/00896* (2013.01); *G06K 15/4055* (2013.01)
USPC ........................................ 358/1.13; 358/1.14

(58) Field of Classification Search
CPC .................................................... G06F 1/3215
USPC ............................................... 358/1.13–1.14
See application file for complete search history.

(56) References Cited

U.S. PATENT DOCUMENTS 6,334,719 B1 * 1/2002 Kimura ........................... 400/54
8,478,361 B2 * 7/2013 Pratt et al. ..................... 455/574
2010/0231390 A1 * 9/2010 Hashimoto ................ 340/573.1
2011/0109937 A1 * 5/2011 Fujiki et al. .................. 358/1.15
2012/0127538 A1 * 5/2012 Mamiya et al. ............... 358/442
2012/0204046 A1 * 8/2012 Baba et al. .................... 713/323
2013/0010335 A1 * 1/2013 Baba et al. ................... 358/3.01
2013/0300198 A1 * 11/2013 Yamashina et al. ............. 307/39

FOREIGN PATENT DOCUMENTS

JP 2012-058645 A 3/2012

* cited by examiner

*Primary Examiner* — Benny Q Tieu
*Assistant Examiner* — Quyen V Ngo
(74) *Attorney, Agent, or Firm* — Fitzpatrick, Cella, Harper & Scinto

(57) ABSTRACT

If a pyroelectric sensor does not detect a heat source after it is determined that the heat source has moved outside a detection region of the pyroelectric sensor, an image processing apparatus is controlled to change from a first power state to a second power state. If the pyroelectric sensor does not detect a heat source before it is determined that the heat source has moved outside the detection region of the pyroelectric sensor, the first power state is stayed in.

10 Claims, 17 Drawing Sheets

1 2 3 4 5 6 7
A B C D E F G
(1) (2) (3) (4) (5)

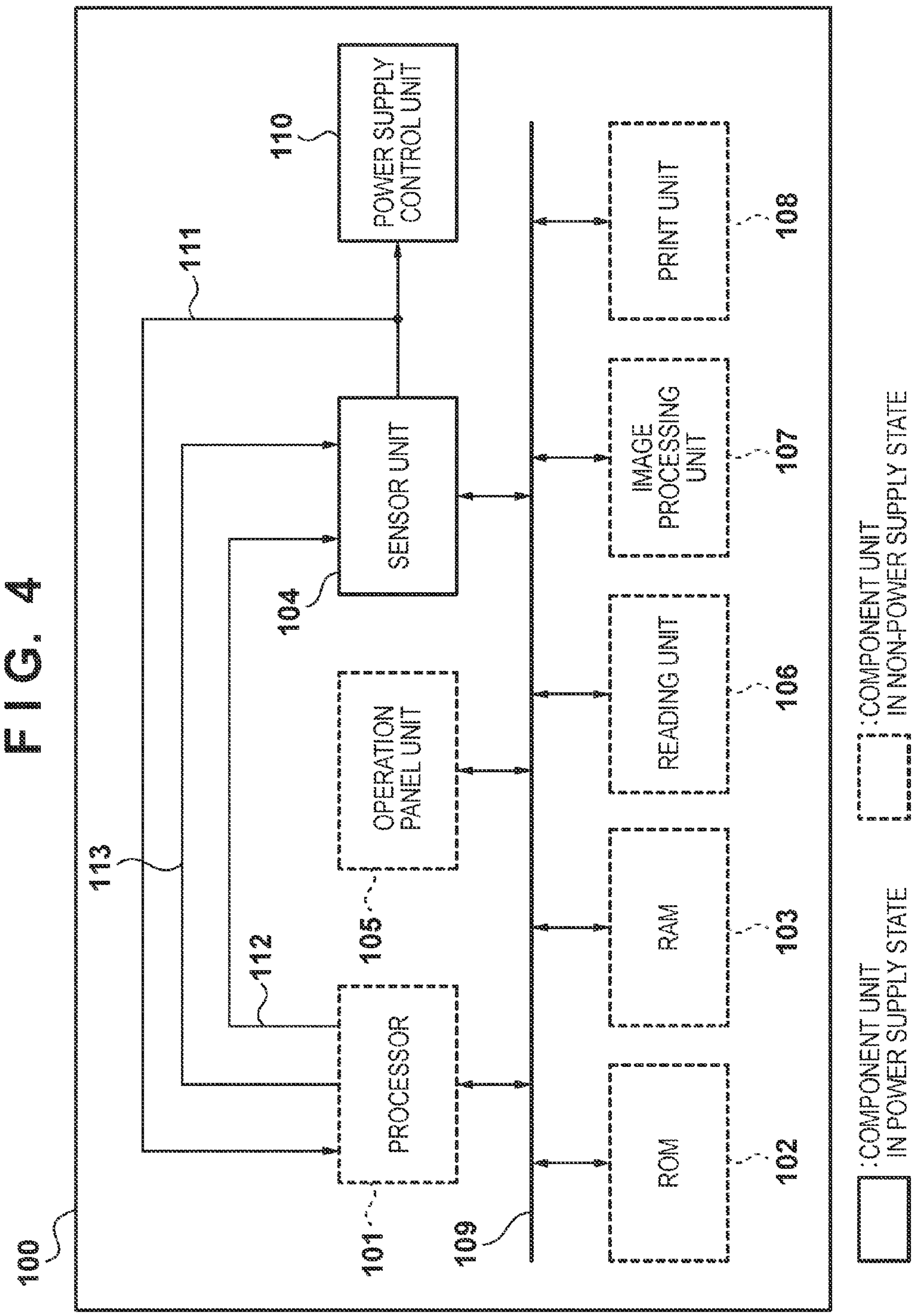
F I G. 4
100
101
PROCESSOR
102
ROM
103
RAM
104
SENSOR UNIT
105
OPERATION PANEL UNIT
106
READING UNIT
107
IMAGE PROCESSING UNIT
108
PRINT UNIT
109
110
POWER SUPPLY CONTROL UNIT
111
112
113
:COMPONENT UNIT IN POWER SUPPLY STATE
:COMPONENT UNIT IN NON-POWER SUPPLY STATE

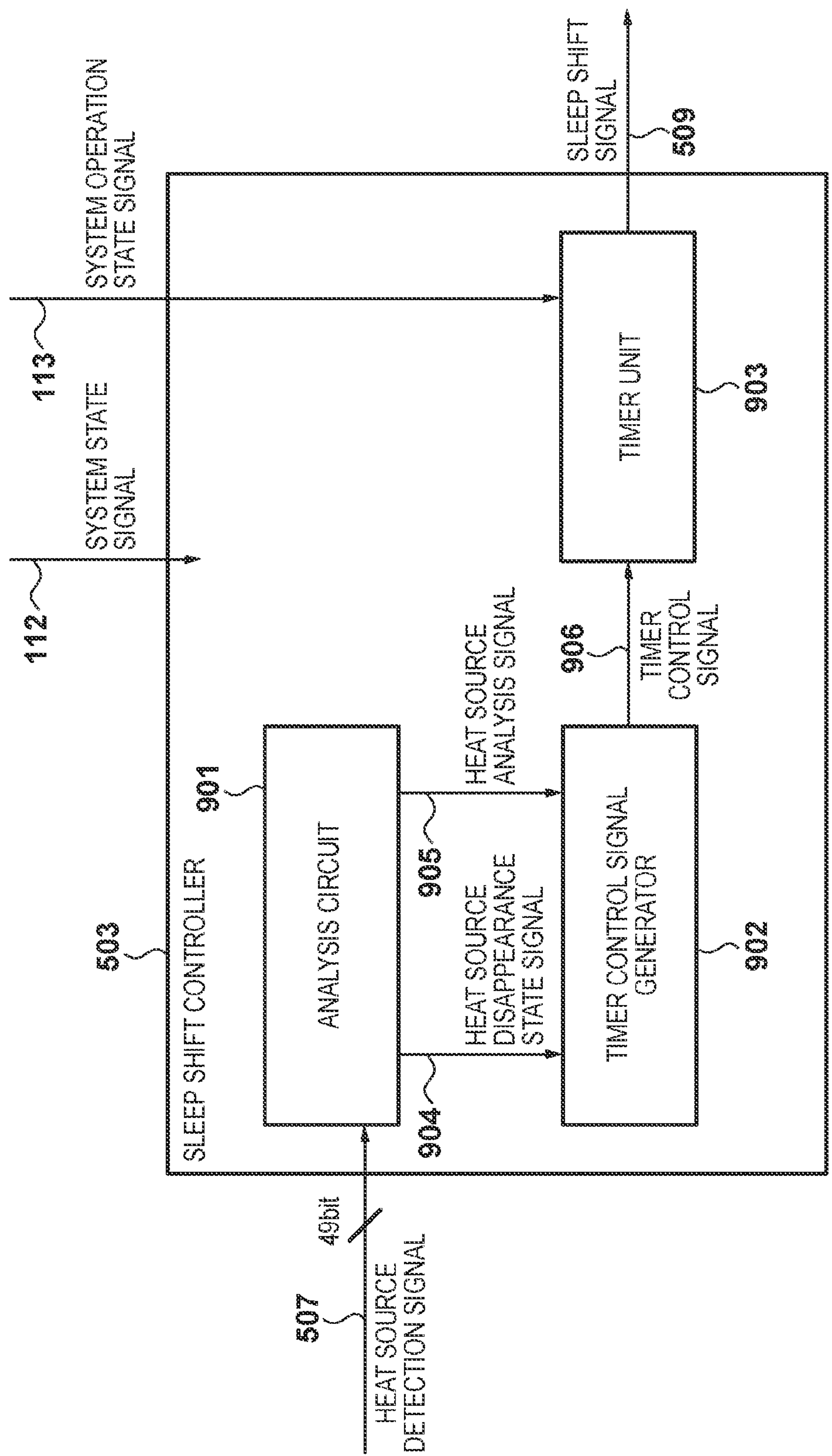
F I G. 9
SLEEP SHIFT CONTROLLER
503
ANALYSIS CIRCUIT
901
TIMER CONTROL SIGNAL GENERATOR
902
TIMER UNIT
903
HEAT SOURCE DISAPPEARANCE STATE SIGNAL
904
HEAT SOURCE ANALYSIS SIGNAL
905
TIMER CONTROL SIGNAL
906
SYSTEM STATE SIGNAL
112
SYSTEM OPERATION STATE SIGNAL
113
SLEEP SHIFT SIGNAL
509
HEAT SOURCE DETECTION SIGNAL
507
49bit F I G. 10
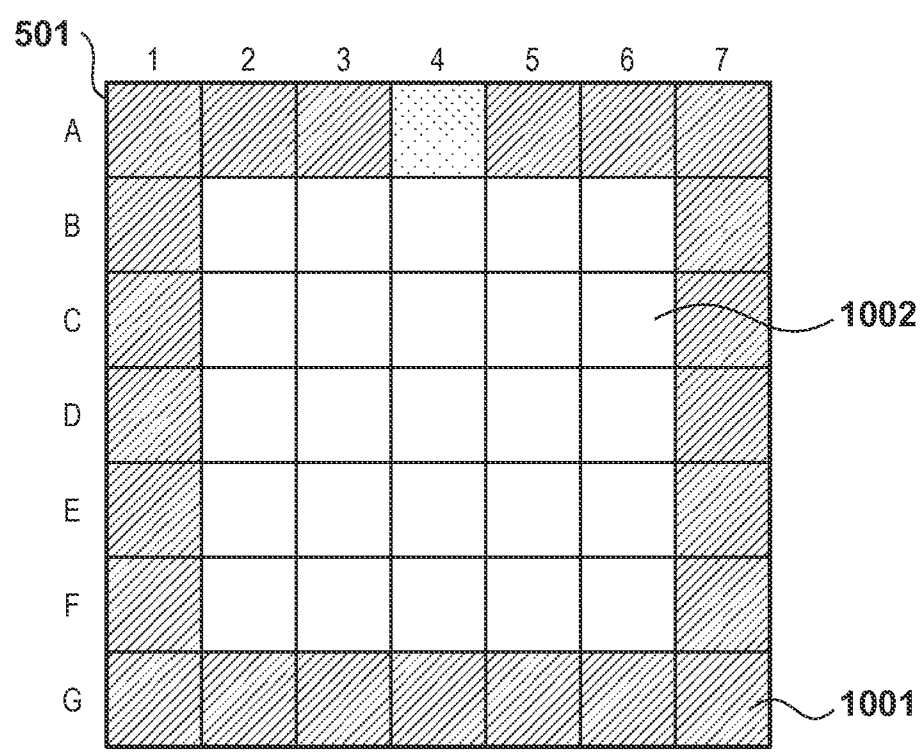

906
TIMER CONTROL SIGNAL
1202
RESET CONTROLLER
RESET PULSE SIGNAL
1204
LOOP TIMER
1203
1205
HEAT SOURCE POSITION SIGNAL
905
HEAT SOURCE ANALYSIS SIGNAL
904
HEAT SOURCE DISAPPEARANCE STATE SIGNAL
TIMER CONTROL CIRCUIT
1201
TIMER CONTROL SIGNAL GENERATOR
902

TIMER UNIT
903
TIMER CONTROL SIGNAL
906
COUNT-DOWN TIMER
1303
SLEEP SHIFT SIGNAL
509
TIMER CONTROL SIGNAL
1304
RESET GENERATOR
1302
SYSTEM OPERATION STATE SIGNAL
113
LOOP TIMER
1301
RESET PULSE SIGNAL
1305

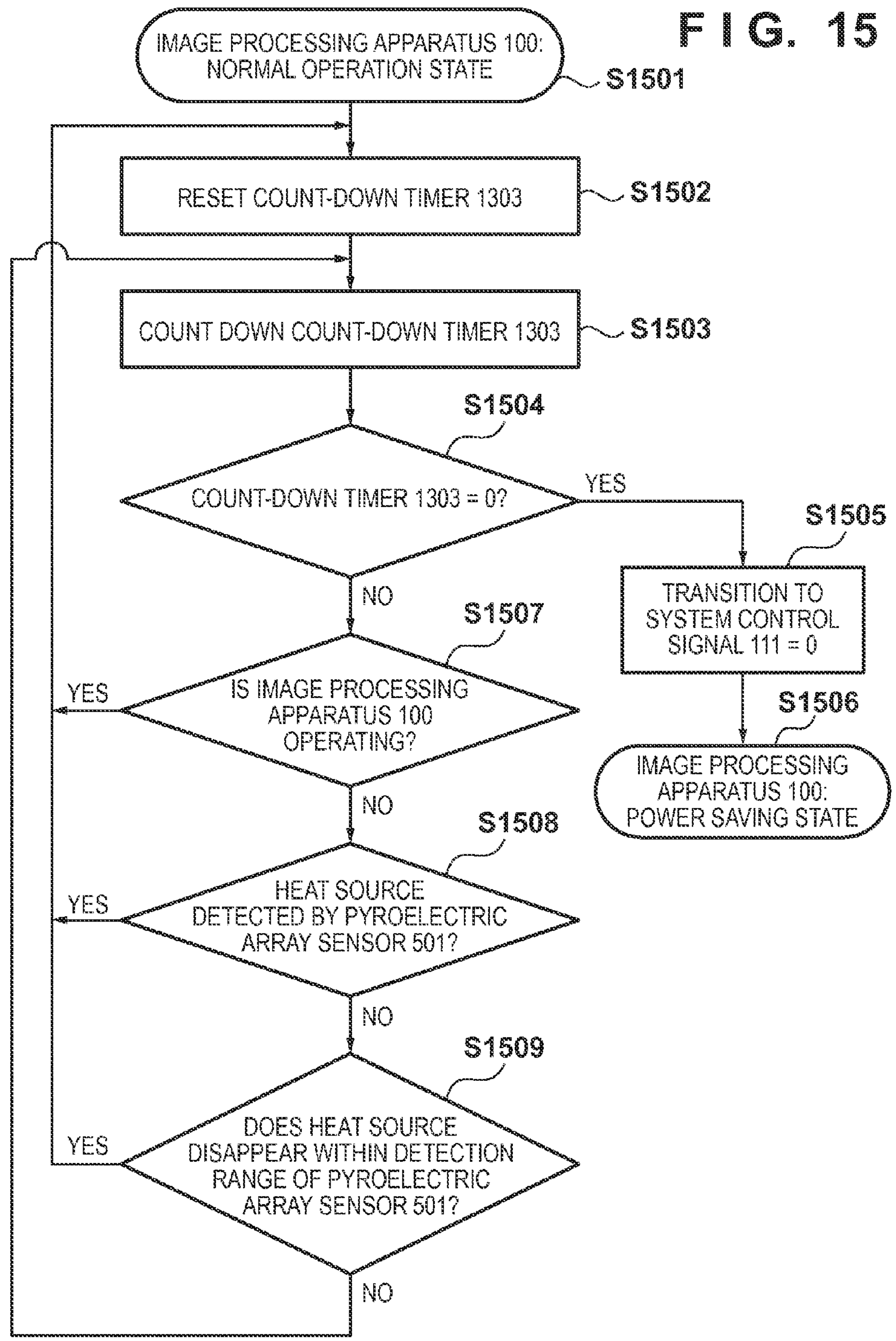

F I G. 15
IMAGE PROCESSING APPARATUS 100: NORMAL OPERATION STATE
S1501
RESET COUNT-DOWN TIMER 1303
S1502
COUNT DOWN COUNT-DOWN TIMER 1303
S1503
S1504
COUNT-DOWN TIMER 1303 = 0?
YES
S1505
TRANSITION TO SYSTEM CONTROL SIGNAL 111 = 0
S1506
IMAGE PROCESSING APPARATUS 100: POWER SAVING STATE
NO
S1507
IS IMAGE PROCESSING APPARATUS 100 OPERATING?
YES
NO
S1508
HEAT SOURCE DETECTED BY PYROELECTRIC ARRAY SENSOR 501?
YES
NO
S1509
DOES HEAT SOURCE DISAPPEAR WITHIN DETECTION RANGE OF PYROELECTRIC ARRAY SENSOR 501?
YES
NO

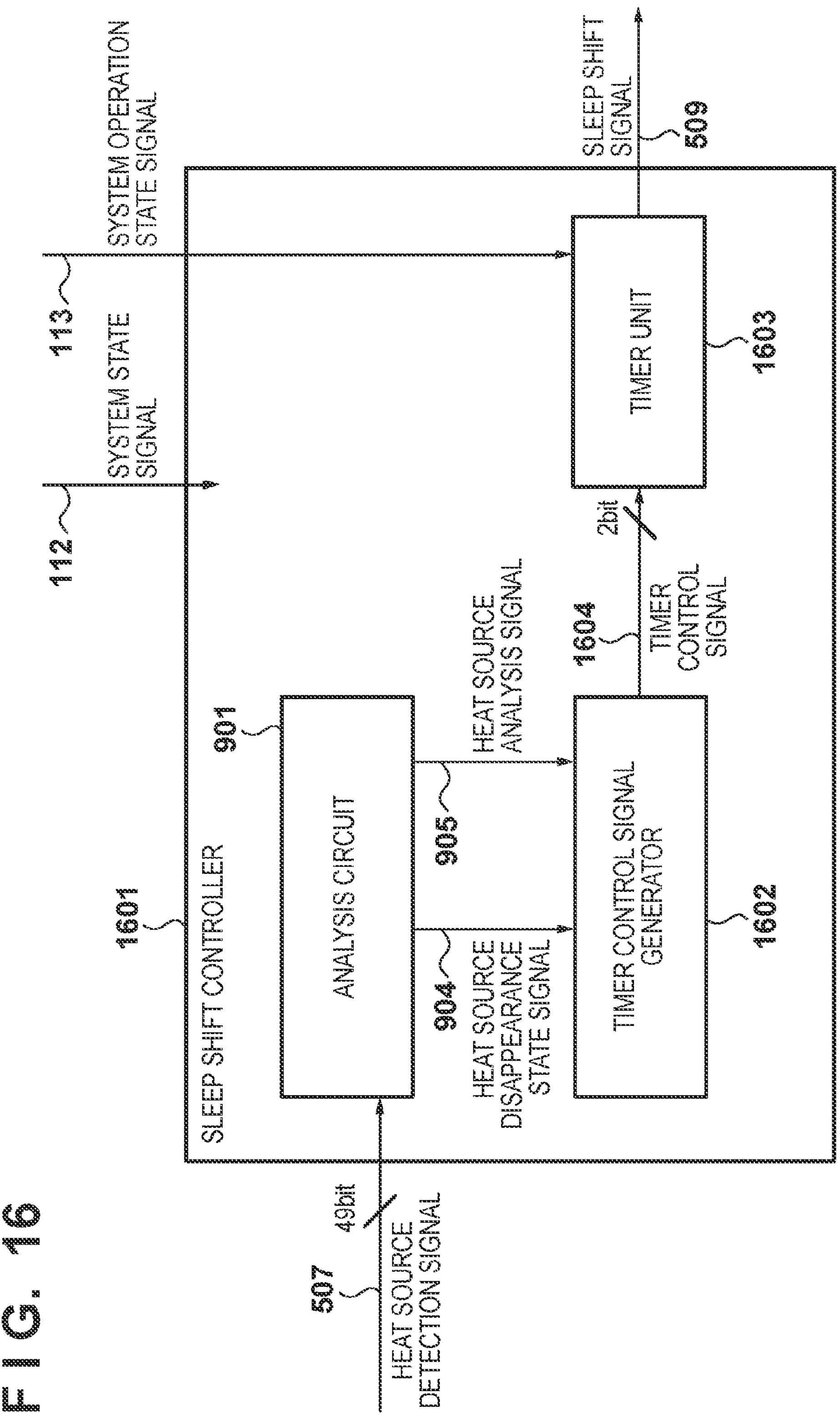
F I G. 16
SLEEP SHIFT CONTROLLER
1601
ANALYSIS CIRCUIT
901
TIMER CONTROL SIGNAL GENERATOR
1602
TIMER UNIT
1603
HEAT SOURCE DETECTION SIGNAL
507
49bit
HEAT SOURCE DISAPPEARANCE STATE SIGNAL
904
HEAT SOURCE ANALYSIS SIGNAL
905
TIMER CONTROL SIGNAL
1604
2bit
SYSTEM STATE SIGNAL
112
SYSTEM OPERATION STATE SIGNAL
113
SLEEP SHIFT SIGNAL
509

F I G. 18
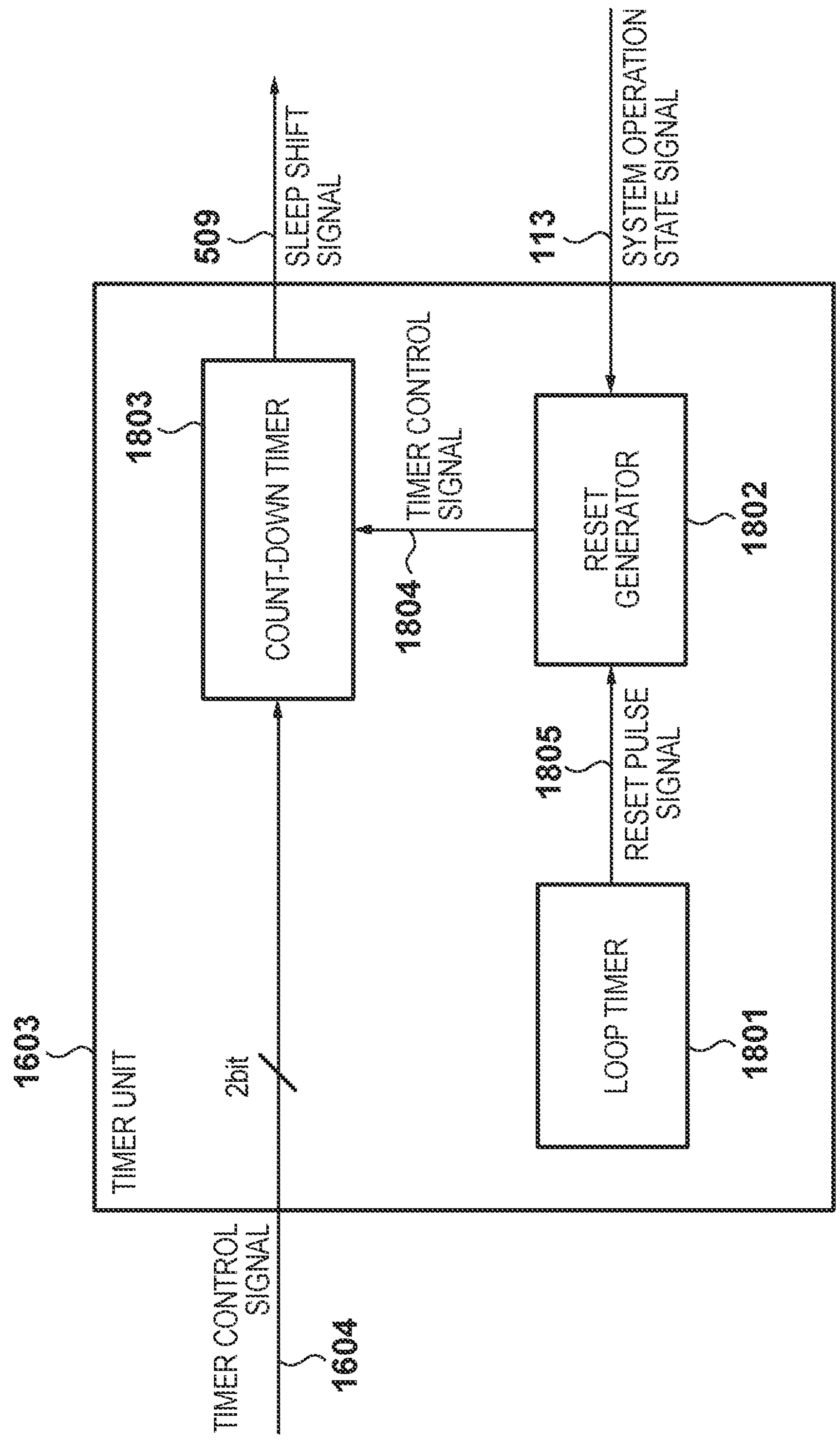

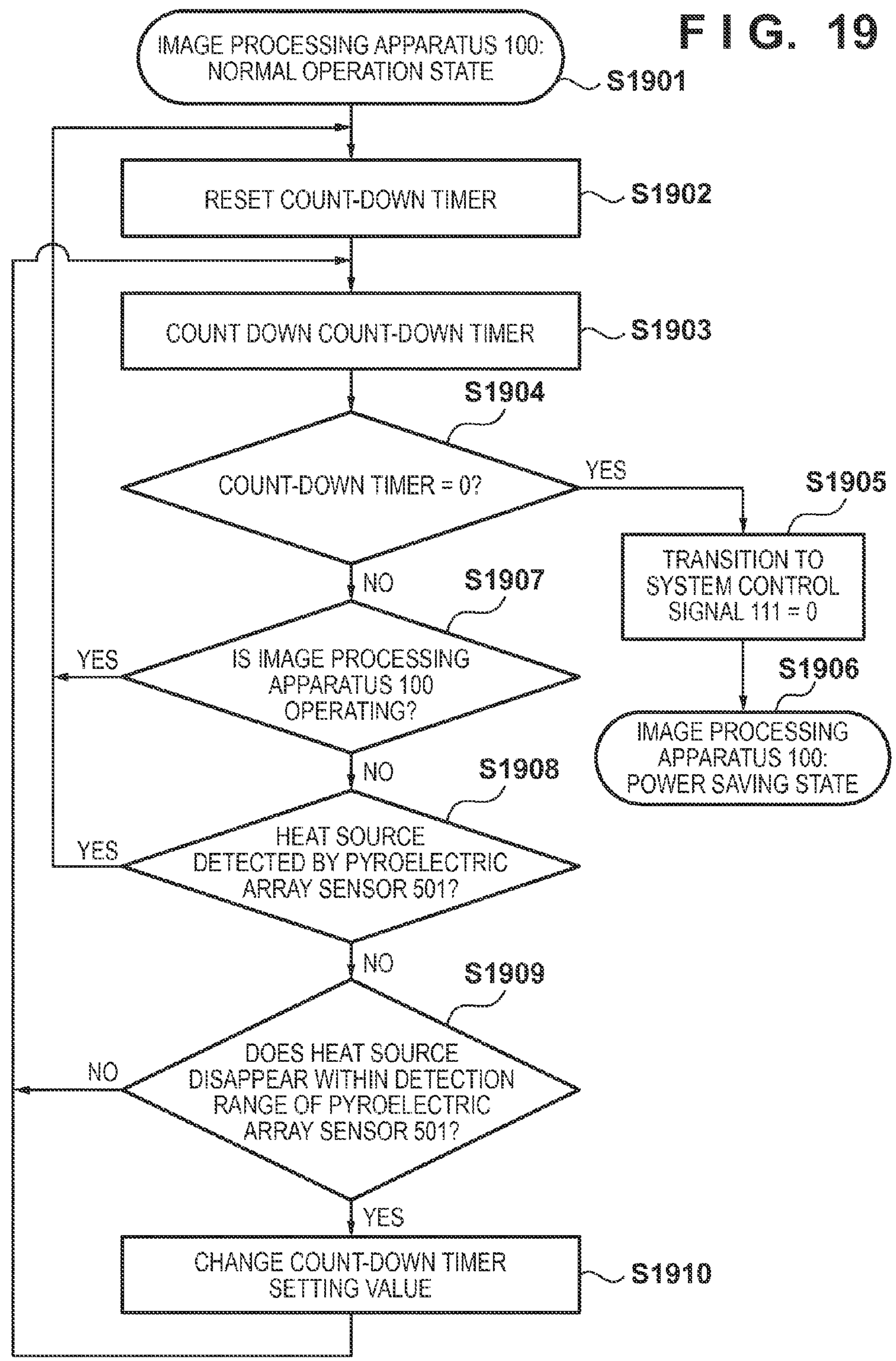
F I G. 19
IMAGE PROCESSING APPARATUS 100: NORMAL OPERATION STATE
S1901
RESET COUNT-DOWN TIMER
S1902
COUNT DOWN COUNT-DOWN TIMER
S1903
S1904
COUNT-DOWN TIMER = 0?
YES
NO
S1905
TRANSITION TO SYSTEM CONTROL SIGNAL 111 = 0
S1906
IMAGE PROCESSING APPARATUS 100: POWER SAVING STATE
S1907
IS IMAGE PROCESSING APPARATUS 100 OPERATING?
YES
NO
S1908
HEAT SOURCE DETECTED BY PYROELECTRIC ARRAY SENSOR 501?
YES
NO
S1909
DOES HEAT SOURCE DISAPPEAR WITHIN DETECTION RANGE OF PYROELECTRIC ARRAY SENSOR 501?
NO
YES
CHANGE COUNT-DOWN TIMER SETTING VALUE
S1910

IMAGE PROCESSING APPARATUS AND CONTROL METHOD FOR DETECTING HEAT SOURCE USING PYROELECTRIC SENSOR

BACKGROUND OF THE INVENTION

1. Field of the Invention

The present invention relates to an image processing apparatus, which includes a pyroelectric sensor, and a control method.

2. Description of the Related Art

Conventionally, a technique for automatically turning off a power source of an image processing apparatus or transitioning to a power saving state when the image processing apparatus is not used, so as to reduce power consumption, is known. For example, by using a timer, when a predetermined time period has elapsed in a state in which the apparatus does not perform any operation, and a state in which an operator does not make any setting operation or the like, the apparatus transitions to a power saving state. Also, a technique for detecting the existence of a user, transitioning an image processing apparatus from a power saving state to a normal operation state when the user comes close to the apparatus, and transitioning the apparatus from the normal operation state to the power saving state when the user moves away from the apparatus is known (Japanese Patent Laid-Open No. 2012-58645).

As a human body detection sensor disclosed in Japanese Patent Laid-Open No. 2012-58645, a pyroelectric sensor may be used. The pyroelectric sensor has a characteristic in that it ceases to be in a detection state if a detected heat source does not make a large motion even when the heat source exists there. As a result, when the pyroelectric sensor ceases to detect a heat source, the image processing apparatus determines that the operator (user) has disappeared, and transitions to the power saving state.

However, in practice, the operator may be troubled over a setting method of an operation unit in front of the image processing apparatus, or may be in front of the image processing apparatus without any large motion so as to select, for example, copy documents. Even in such case, since the heat source does not make any large motion, the pyroelectric sensor ceases to be in a detection state, and the image processing apparatus transitions to the power saving mode. As a result, when the operator wants to make settings on the operation unit or wants to copy documents after selection of the copy documents is complete, the image processing apparatus transitions to the power saving mode, and the operator has to make an operation for resuming the image processing apparatus to the normal operation state. Then, the operator has to wait in front of the image processing apparatus until the image processing apparatus is resumed from the power saving mode to the normal operation mode, thus considerably impairing the convenience.

SUMMARY OF THE INVENTION

An aspect of the present invention is to eliminate the above-mentioned problems with the conventional technology. The present invention provides an image processing apparatus which appropriately transitions to a power saving state according to a state of the user, and a control method.

The present invention in one aspect provides an image processing apparatus, which operates in a first power state and a second power state different from the first power state, comprising: a pyroelectric sensor configured to detect a heat source; a determination unit configured to determine whether or not the heat source has moved outside a detection region of the pyroelectric sensor; and a control unit configured to control, in a case where the pyroelectric sensor does not detect the heat source after the determination unit determines that the heat source has moved outside the detection region, the image processing apparatus to change from the first power state to the second power state, and to stay in, in a case where the pyroelectric sensor does not detect the heat source before the determination unit determines that the heat source has moved outside the detection region, the first power state.

According to the present invention, the image processing apparatus can appropriately transition to a power saving state according to a state of the user.

Further features of the present invention will become apparent from the following description of exemplary embodiments with reference to the attached drawings.

BRIEF DESCRIPTION OF THE DRAWINGS

FIG. 4 is a block diagram showing a power saving state in which a power supply is limited;

FIG. 9 is a block diagram showing the internal arrangement of a sleep shift controller;

FIG. 10 is a view showing a movement of a heat source;

FIG. 15 is a flowchart showing the sequence of transition control processing;

FIG. 16 is a block diagram showing the internal arrangement of a sleep shift controller;

FIG. 18 is a block diagram showing the internal arrangement of a timer unit; and FIG. 19 is a flowchart showing the sequence of transition control processing.

DESCRIPTION OF THE EMBODIMENTS

Figure 1:
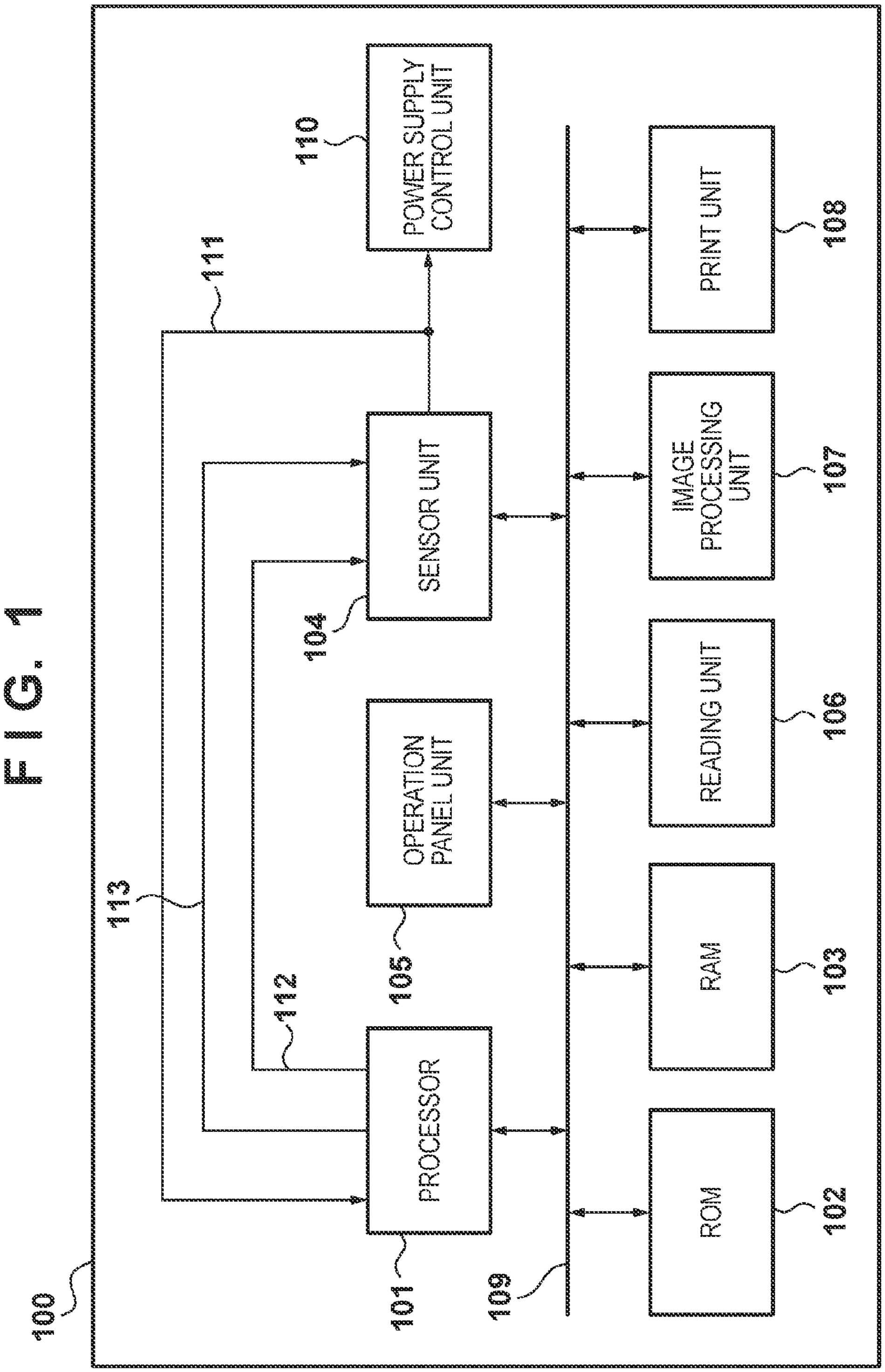
FIG. 1 is a block diagram showing the arrangement of an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will not be repeated.

First Embodiment

FIG. 1 is a block diagram showing the arrangement of an image processing apparatus 100 according to the first embodiment. The image processing apparatus 100 includes the following components. A processor 101 controls the overall image processing apparatus 100. A ROM 102 stores programs of the processor 101. A RAM 103 is used when the processor 101 executes programs. For example, operations of embodiments to be described later are implemented when the processor 101 expands programs stored in the ROM 102 onto the RAM 103 and executes the expanded programs. Also, the RAM 103 is used when the image processing apparatus 100 temporarily stores intermediate processing data when it executes various functions such as a print function and copy function.

A sensor unit 104 includes, for example, a pyroelectric sensor. This pyroelectric sensor detects light including infrared rays (for example, infrared rays emitted from a human being (to be referred to as a heat source hereinafter)) by a pyroelectric effect. A sensor detection region of the sensor unit 104 is divided into a plurality of regions (pyroelectric cells), and the sensor unit 104 independently performs detection operations for respective regions. That is, the pyroelectric sensor in this embodiment is a pyroelectric array sensor (to be also simply referred to as a pyroelectric sensor hereinafter) including a plurality of pyroelectric cells, and can detect movement of a heat source in a predetermined area in the vicinity of a front position of the image processing apparatus 100. As a general feature, the pyroelectric array sensor ceases to detect a heat source when the heat source does not make any large motion. For example, when the operator stays still in front of an operation unit of the image processing apparatus 100, a detection state of the heat source becomes no longer set. The sensor unit 104 detects a heat source near the image processing apparatus 100 when the image processing apparatus 100 is in a power saving state, and when the sensor unit 104 determines that the heat source comes closer to the image processing apparatus 100, it notifies a power supply control unit 110 and processor 101 of that information using a system control signal 111.

An operation panel unit 105 accepts an operation instruction from the operator (user) to the image processing apparatus 100, and displays statuses and the like of the image processing apparatus 100. A reading unit 106 generates image data by optically reading a document placed on a document table of the image processing apparatus 100. An image processing unit 107 acquires image data generated by the reading unit 106 via the RAM 103, and executes image processing for that image data. A print unit 108 acquires the image data, which has undergone the image processing by the image processing unit 107, via the RAM 103, and prints the image data on a printing medium such as a print sheet. A bus 109 connects the processor 101, ROM 102, RAM 103, sensor unit 104, operation panel unit 105, reading unit 106, image processing unit 107, and print unit 108 to be able to communicate with each other. The power supply control unit 110 supplies electric power to the respective components, that is, the processor 101, ROM 102, RAM 103, sensor unit 104, operation panel unit 105, reading unit 106, image processing unit 107, and print unit 108.

The image processing apparatus 100 has two states, that is, a normal operation state (first power state) in which copy operations, print operations, and the like are performed, and a power saving state (power saving mode: second power state) such as a sleep state in which the image processing apparatus 100 is not used by the operator and power consumption is to be suppressed. The power supply control unit 110 controls power supply to the respective components according to these two states. When the image processing apparatus 100 is in the normal operation state, the power supply control unit 110 controls to supply electric power to all the components. On the other hand, when the image processing apparatus 100 is in the power saving state, the power supply control unit 110 controls to supply electric power to only a power source of the power supply control unit 110 itself and the sensor unit 104, as shown in FIG. 4. Transition from the power saving state to the normal operation state is made based on the system control signal 111 output when it is determined that a heat source has detected in the vicinity of the image processing apparatus 100 comes closer to the image processing apparatus 100. Also, when the image processing apparatus is in the normal operation state, transition from the normal operation state to the power saving state is made based on the system control signal 111 output when the heat source ceases to be detected from the vicinity of the image processing apparatus 100.

The processor 101 outputs a system state signal 112 and system operation state signal 113 to the sensor unit 104. The system state signal 112 outputs "0" when the image processing apparatus 100 is in the normal operation state, and outputs "1" when the image processing apparatus 100 is in the power saving state. Also, the system operation state signal 113 is a signal indicating an operation state of the image processing apparatus 100, and outputs "0" when print operations of the image processing apparatus 100 are underway or when the operator is making setting inputs on the operation panel unit 105. On the other hand, when the operation is stopped and no input or the like is made from the operation panel unit 105, the system operation state signal 113 outputs "1".

Figure 2:
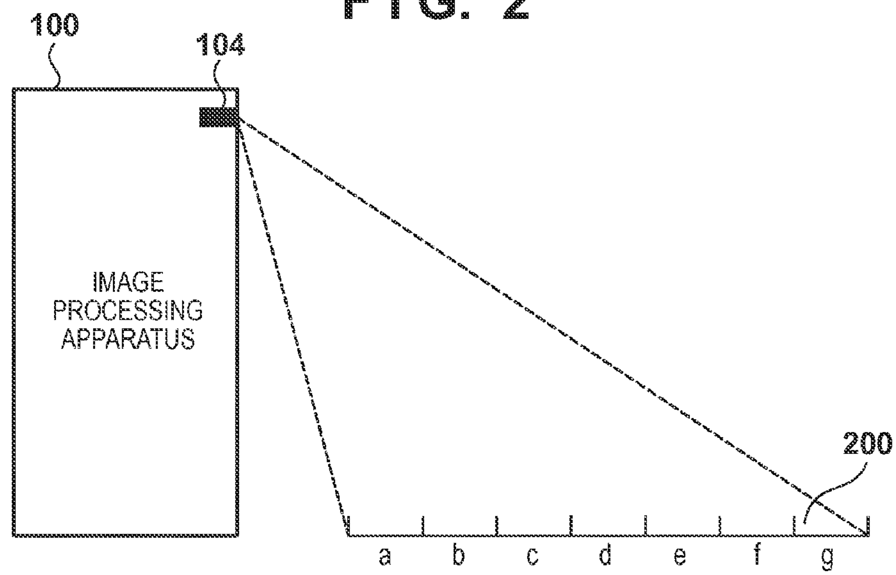
FIG. 2 is a view showing the positional relationship between the image processing apparatus and a sensor detection region.
Figure 3:
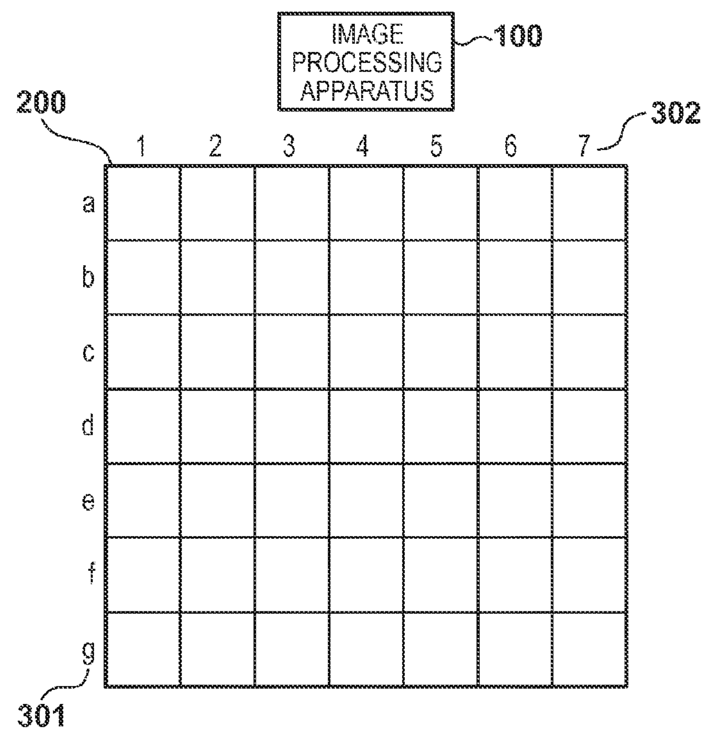
FIG. 3 is another view showing the positional relationship between the image processing apparatus and the sensor detection region.

FIG. 2 is a view for explaining the positional relationship when the image processing apparatus and sensor detection region are viewed from the side surface of the image processing apparatus 100. A sensor detection region 200 shown in FIG. 2 is a detectable region of the sensor unit 104, which is arranged to face a downward position in front of the image processing apparatus 100. FIG. 3 is a view showing the positional relationship between the image processing apparatus 100 and sensor detection region 200 when viewed from the above of the image processing apparatus 100. 7×7 cells shown in FIG. 3 are associated with a plurality of regions which can be independently detected by respective sensor regions of the sensor unit 104 shown in FIG. 2. Rows 301 in FIG. 3 represent those of cells used to explain positions of the detection regions, and are denoted by a, b, c, d, e, f, and g in turn from the side closer to the image processing apparatus 100. Also, columns 302 represent those of cells, and are denoted by 1, 2, 3, 4, 5, 6, and 7 in turn from the left facing the image processing apparatus 100. For example, a left end region closest to the image processing apparatus 100 is expressed by a1, and a right end region closest to the image processing apparatus 100 is expressed by a7. In this way, the positions of the respective regions, that is, the detection positions of the sensor unit 104 are expressed.

Figure 5:
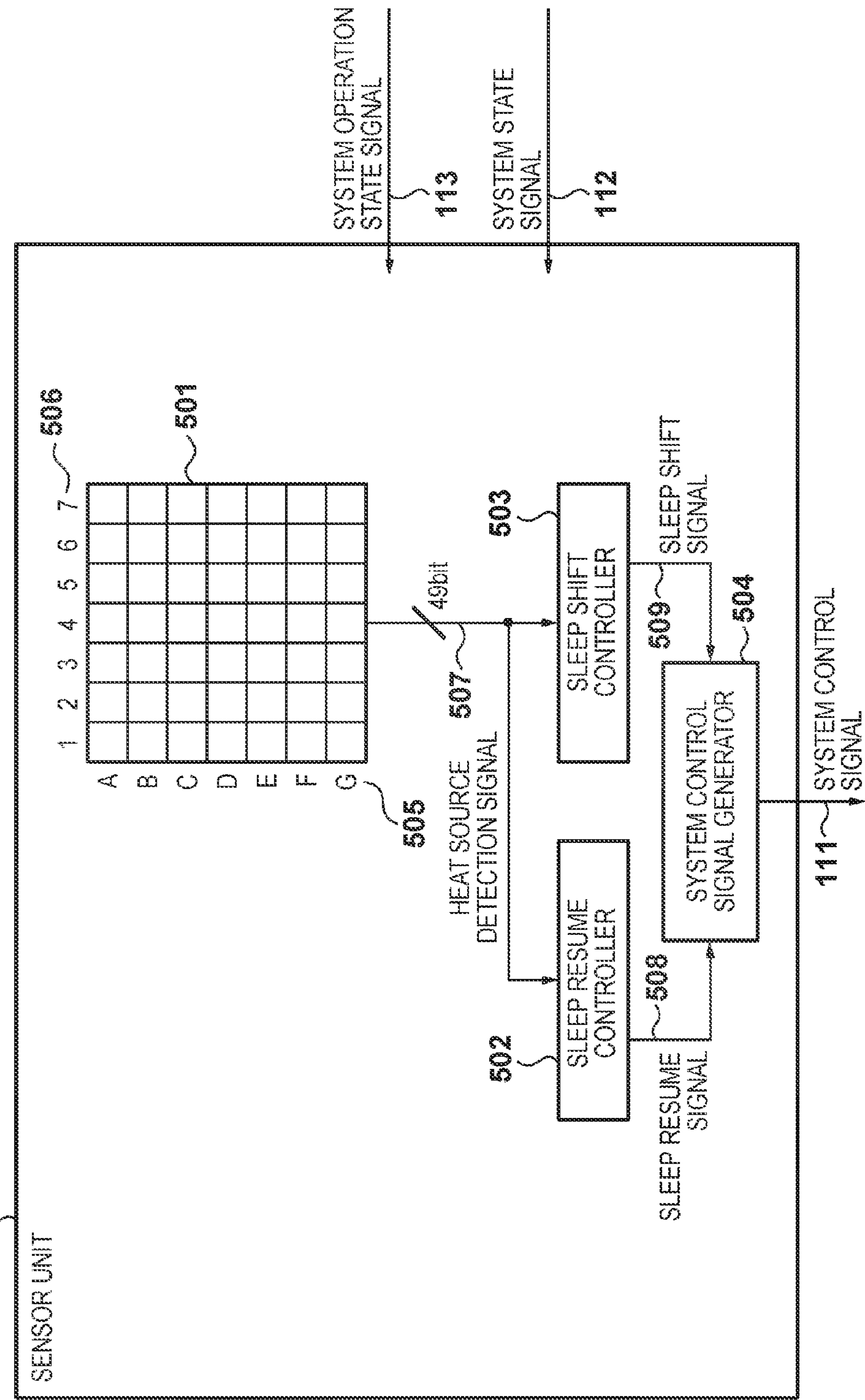
FIG. 5 is a block diagram showing the internal arrangement of a sensor unit.

FIG. 5 is a block diagram showing the internal arrangement of the sensor unit 104. A pyroelectric array sensor 501 is divided into 7×7 cells in a matrix, and corresponding pyroelectric cells are arranged in respective regions in a predetermined area on the front side of the image processing apparatus 100. Alternatively, the pyroelectric array sensor 501 may be a line sensor including a linear pyroelectric cell array instead of a matrix. Rows 505 represent those of the matrix of the pyroelectric array sensor 501, and A, B, C, D, E, F, and G respectively correspond to a, b, c, d, e, f, and g of the cells of the detection regions shown in FIG. 3. Columns 506 represent those of the matrix of the pyroelectric array sensor 501, and 1, 2, 3, 4, 5, 6, and 7 respectively correspond to 1, 2, 3, 4, 5, 6, and 7 of the cells of the detection regions shown in FIG. 3. For example, when a heat source is located in a detection regional a1 shown in FIG. 3, a pyroelectric cell A1 shown in FIG. 5 detects the heat source.

A sleep resume controller 502 is active when the image processing apparatus 100 is in the power saving state, and outputs a sleep resume signal 508 based on a heat source detection signal 507 detected by the pyroelectric array sensor 501. A sleep shift controller 503 is active when the image processing apparatus 100 is in the normal operation state, and outputs a sleep shift signal 509 based on the heat source detection signal 507 detected by the pyroelectric array sensor 501. The pyroelectric array sensor 501, the sleep resume controller 502, and sleep shift controller 503 are connected via 49-bit signal lines. Signal lines corresponding to the 49 bits respectively correspond to detection signals of the pyroelectric cells at positions A1 to G7 of the detection regions.

In this embodiment, a pyroelectric cell which detects a heat source outputs a detection signal “High(1)”, and a pyroelectric cell which does not detect any heat source outputs a detection signal “Low(0)”. Respective bits output detection signals of pyroelectric cells in turn in such a manner that bit 0 outputs a detection signal of a pyroelectric cell at a position A1, bit 1 outputs a detection signal of a pyroelectric cell at a position A2, . . . , bit 48 outputs a detection signal of a pyroelectric cell at a position G7. Detection of movement of a heat source by the pyroelectric array sensor 501 will be described below.

Figure 6:
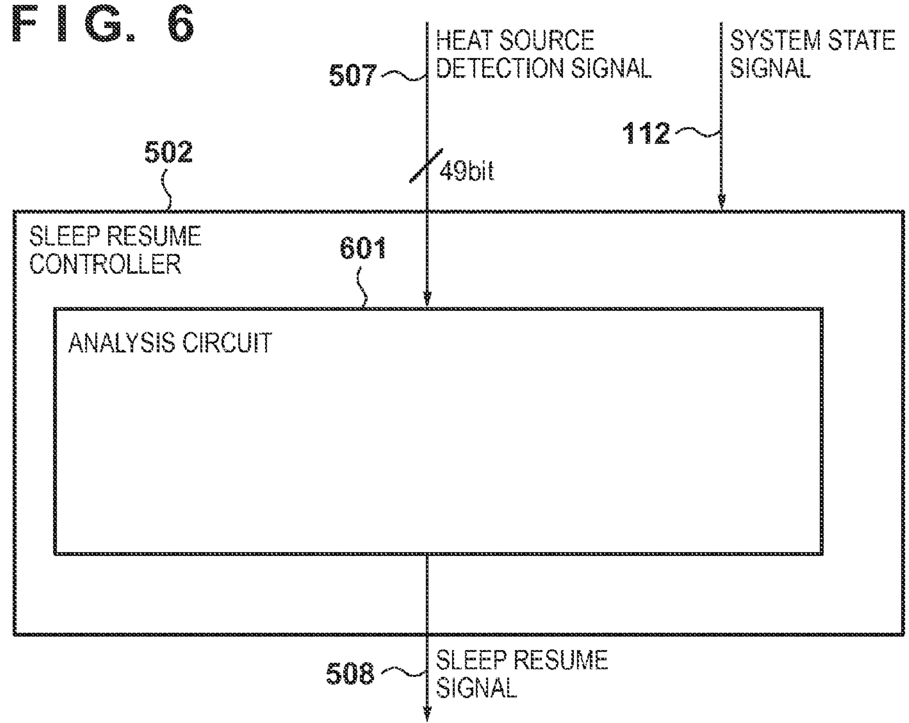
FIG. 6 is a block diagram showing the internal arrangement of a sleep resume controller.

FIG. 6 is a block diagram showing the internal arrangement of the sleep resume controller 502. The sleep resume controller 502 inputs the heat source detection signal 507 and outputs the sleep resume signal 508. The sleep resume controller 502 includes an analysis circuit 601. In this embodiment, detection of the presence/absence of a heat source using the heat source detection signal 507, that of movement of the heat source, and the like are made by a small-scale data processing circuit such as a microcomputer.

Figure 7:
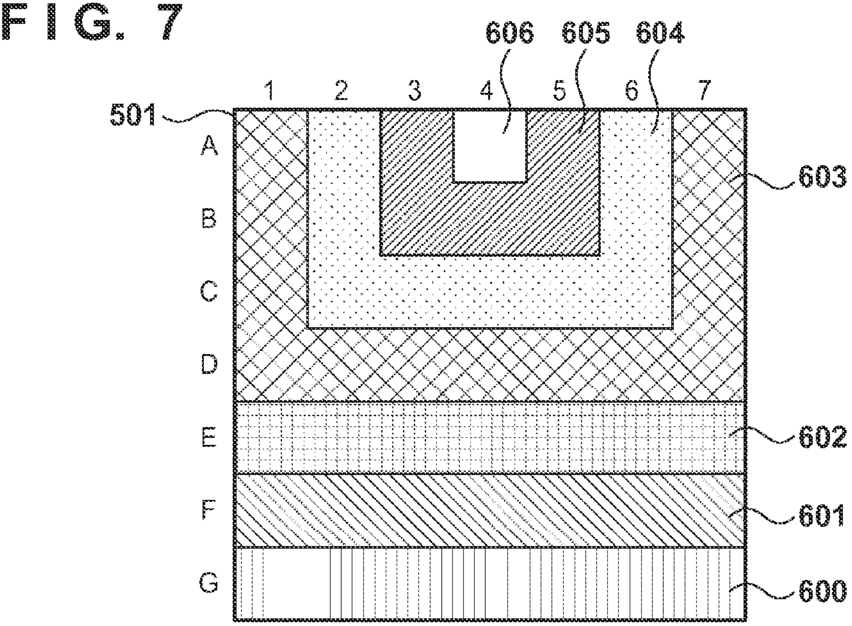
FIG. 7 is a view showing grouping of pyroelectric cells in a pyroelectric array sensor.

FIG. 7 shows region groups obtained by grouping pyroelectric cells for some regions of the pyroelectric array sensor 501. In this embodiment, a plurality of region groups are concentrically set to have a region A4 closest to the image processing apparatus 100 as the center. Let Grp[6] be a region 606 in FIG. 7, Grp[5] be a region 605, Grp[4] be a region 604, Grp[3] be a region 603, Grp[2] be a region 602, Grp[1] be a region 601, and Grp[0] be a region 600. That is, the pyroelectric cells of the pyroelectric array sensor 501 correspond to groups shown in Table 1.

TABLE 1

| Pyroelectric array region | Corresponding group |
|---|---|
| A1 | Grp[3] |
| A2 | Grp[4] |
| A3 | Grp[5] |
| A4 | Grp[6] |
| A5 | Grp[5] |
| A6 | Grp[4] |
| A7 | Grp[3] |
| B1 | Grp[3] |
| B2 | Grp[4] |
| B3 | Grp[5] |
| B4 | Grp[5] |
| B5 | Grp[5] |
| B6 | Grp[4] |
| B7 | Grp[3] |
| C1 | Grp[3] |
| C2 | Grp[4] |
| C3 | Grp[4] |
| C4 | Grp[4] |
| C5 | Grp[4] |
| C6 | Grp[4] |
| C7 | Grp[3] |
| D1 | Grp[3] |
| D2 | Grp[3] |
| D3 | Grp[3] |
| D4 | Grp[3] |
| D5 | Grp[3] |
| D6 | Grp[3] |
| D7 | Grp[3] |
| E1 | Grp[2] |
| E2 | Grp[2] |
| E3 | Grp[2] |
| E4 | Grp[2] |
| E5 | Grp[2] |
| E6 | Grp[2] |
| E7 | Grp[2] |
| F1 | Grp[1] |
| F2 | Grp[1] |
| F3 | Grp[1] |
| F4 | Grp[1] |
| F5 | Grp[1] |
| F6 | Grp[1] |
| F7 | Grp[1] |
| G1 | Grp[0] |
| G2 | Grp[0] |
| G3 | Grp[0] |
| G4 | Grp[0] |
| G5 | Grp[0] |
| G6 | Grp[0] |
| G7 | Grp[0] |

The analysis unit 601 detects movement as to whether or not a heat source comes closer to or moves away from the image processing apparatus 100 using the region groups shown in Table 1. The analysis circuit 601 detects region groups corresponding to an order of detection of detection signals of pyroelectric cells. When the region group numbers are equal to or larger than those of the region groups detected immediately before, the analysis unit 601 determines that the heat source comes closer to the image processing apparatus 100. On the other hand, when the region group numbers are equal to or smaller than those of the region groups detected immediately before, the analysis unit 601 determines that the heat source moves away from the image processing apparatus 100.

Figure 8A:
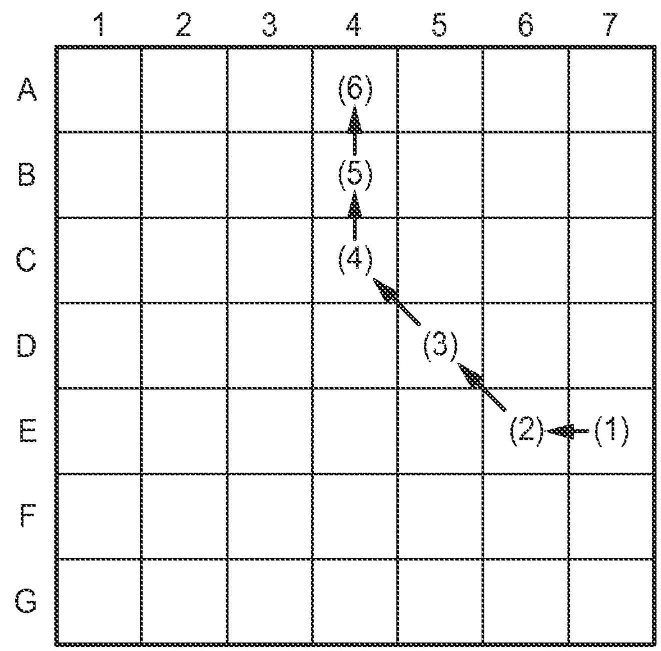
FIGS. 8A and 8B are views showing movements of a heat source.

A case will be assumed wherein heat source detection signals of pyroelectric cells move in an order of (1), (2), (3), (4), (5), and (6), as shown in FIG. 8A. In this case, as shown in Detection example 1 of Table 2, pyroelectric cells detect a heat source in a order of E7, E6, D5, C4, B4, and A4.

TABLE 2

| | Recognition order (1) Pyroelectric array region | Recognition order (1) Corresponding group | Recognition order (2) Pyroelectric array region | Recognition order (2) Corresponding group |
|---|---|---|---|---|
| Detection example 1 | E7 | Grp[2] | E6 | Grp[2] |
| Detection example 2 | C1 | Grp[3] | C2 | Grp[4] |

| | Recognition order (3) Pyroelectric array region | Recognition order (3) Corresponding group | Recognition order (4) Pyroelectric array region | Recognition order (4) Corresponding group |
|---|---|---|---|---|
| Detection example 1 | D5 | Grp[3] | C4 | Grp[4] |
| Detection example 2 | D3 | Grp[3] | D4 | Grp[3] |

| | Recognition order (5) Pyroelectric array region | Recognition order (5) Corresponding group | Recognition order (6) Pyroelectric array region | Recognition order (6) Corresponding group |
|---|---|---|---|---|
| Detection example 1 | B4 | Grp[5] | A4 | Grp[6] |
| Detection example 2 | E5 | Grp[2] | F5 | Grp[1] |

| | Recognition order (7) Pyroelectric array region | Recognition order (7) Corresponding group |
|---|---|---|
| Detection example 1 | — | — |
| Detection example 2 | G6 | Grp[0] |

The region groups of the pyroelectric cells are Grp[2], Grp[2], Grp[3], Grp[4], Grp[5], and Grp[6], and the region group numbers are equal to or larger than the group numbers detected immediately before. Then, finally, since Grp[6], that is, the region in front of the image processing apparatus 100 is reached, it is determined that the heat source comes closer to the image processing apparatus 100.

Figure 8B:
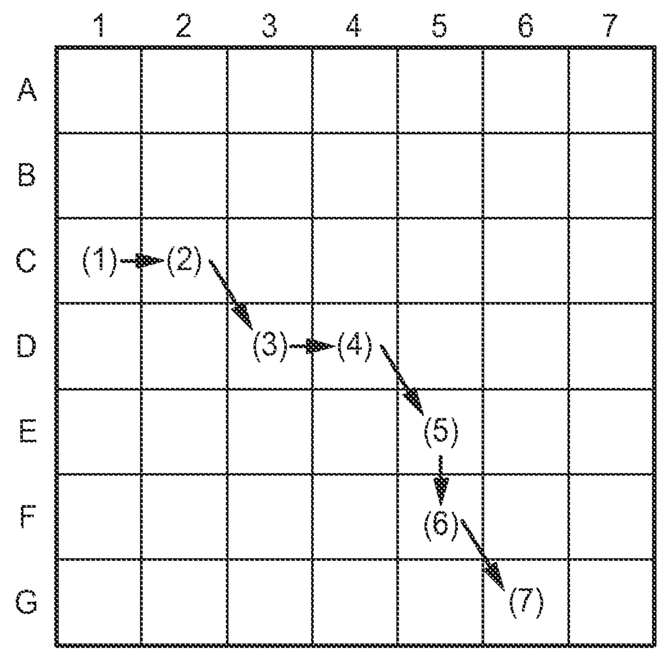

Next, a case will be assumed wherein heat source detection signals of pyroelectric cells move in an order of (1), (2), (3), (4), (5), (6), and (7), as shown in FIG. 8B. In this case, as shown in Detection example 2 in Table 2, pyroelectric cells detect a heat source in a order of C1, C2, D3, D4, E5, F5, and G6. At this time, the region groups of the pyroelectric cells are Grp[3], Grp[4], Grp[3], Grp[3], Grp[2], Grp[1], and Grp[0], and the region group numbers become smaller from group numbers detected immediately before. Then, lastly, since Grp [0], that is, the group on the outer side of the pyroelectric array sensor is reached, it is determined that the heat source moves away from the image processing apparatus 100.

In this embodiment, the sleep resume controller 502 inputs, from the processor 101, the system state signal 112 indicating whether the image processing apparatus 100 is in the power saving state or normal operation state, and is active even in the sleep mode. The system state signal 112 is "1" in the power saving state, and it is "0" in the normal operation state. When the system state signal 112 is "1" (power saving state), the sleep resume controller 502 operates intact. Also, when the sleep resume controller 502 detects movement of a heat source based on detection signals from the pyroelectric array sensor 501, and determines that the heat source comes closer to the image processing apparatus 100, it outputs the sleep resume signal 508, thus resuming from the power saving state to the normal operation state.

Next, the sleep shift controller 503 will be described in detail below. The sleep shift controller 503 inputs the system state signal 112 from the processor 101, and is active in the normal operation state. FIG. 9 is a block diagram showing the internal arrangement of the sleep shift controller 503. The sleep shift controller 503 inputs the heat source detection signal 507, system state signal 112, and system operation state signal 113, and outputs a sleep shift signal 509. The sleep shift controller 503 includes an analysis circuit 901, timer control signal generator 902, and timer unit 903. The analysis circuit 901 inputs the heat source detection signal 507 input from the pyroelectric array sensor 501, and outputs a heat source disappearance state signal 904 and heat source analysis signal 905. The timer control signal generator 902 inputs the heat source disappearance state signal 904 and heat source analysis signal 905, and outputs a timer control signal 906. The timer unit 903 inputs the timer control signal 906, and outputs the sleep shift signal 509.

The analysis circuit 901 inputs the heat source detection signal 507 from the pyroelectric array sensor 501. When the analysis circuit 901 detects that a heat source ceases to be detected from the detection region, it determines that an operator (heat source) has disappeared, and transitions to the power saving state. However, in this embodiment, this embodiment distinguishes a case in which a heat source ceases to be detected when it does not make any large motion from a case in which a heat source ceases to be detected since it has moved outside the detection region, so as to execute mode transition control to the power saving state. In this case, distinction of states when a heat source ceases to be detected will be described below.

FIG. 10 shows region groups obtained by grouping pyroelectric cells of the pyroelectric array sensor 501 of this embodiment into two regions. In this embodiment, let A4 be a region closest to the image processing apparatus 100. Then, let GrpA 1001 be one group including a total of 23 pyroelectric cells corresponding to the outermost periphery other than A4, that is, a column from pyroelectric cells A1 to G1, a column from A7 to G7, a column from G2 to G7, and A2, A3, A5, and A6. Also, let GrpB 1002 be another group including 26 pyroelectric cells other than the GrpA 1001.

When the GrpA 1001 has detected a heat source immediately before the heat source ceases to be detected, it is determined that the heat source has moved outside the detection region of the pyroelectric array sensor 501. When the GrpB 1002 has detected a heat source immediately before the heat source ceases to be detected, it is determined that the heat source ceases to be detected since it did not make any large motion within the detection region of the pyroelectric array sensor 501.

Figure 11A:
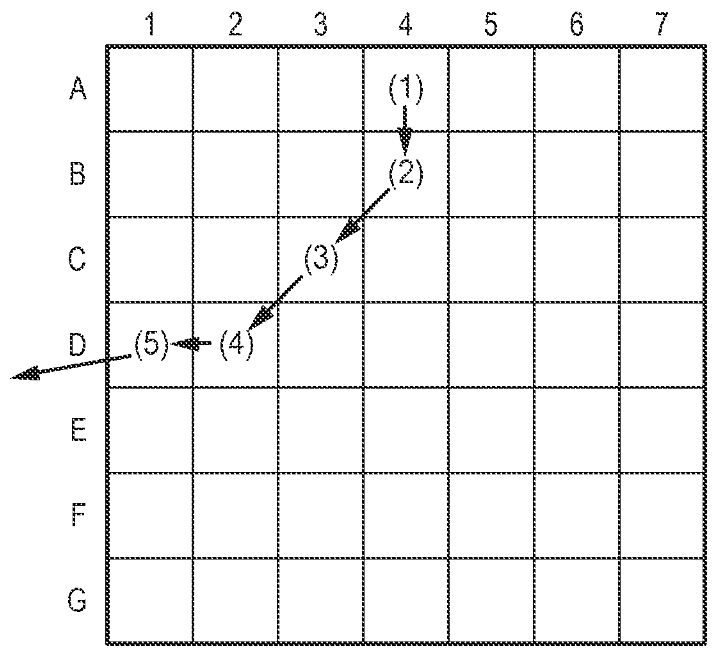
FIGS. 11A and 11B are views when a heat source ceases to be detected.
Figure 11B:
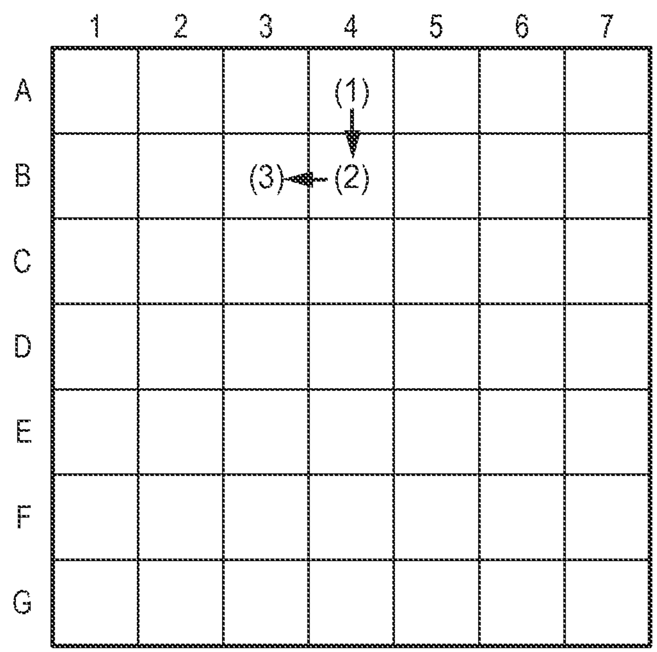

For example, a case will be assumed wherein a heat source has moved in an order of (1), (2), (3), (4), and (5), and ceases to be detected, as shown in FIG. 11A. In this case, since the pyroelectric cell at the position (5), that is, the GrpA 1001 has detected the heat source immediately before the heat source ceases to be detected, it is determined that the heat source has moved outside the detection region of the pyroelectric array sensor 501. Also, a case will be assumed wherein a heat source has moved in an order of (1), (2), and (3), and ceases to be detected, as shown in FIG. 11B. In this case, since the pyroelectric cell at the position (3), that is, the GrpB 1002 has detected the heat source immediately before the heat source ceases to be detected, it is determined that the heat source ceases to be detected since it did not make any large motion within the detection region of the pyroelectric array sensor 501.

In this embodiment, the heat source disappearance state signal 904 outputs "1" when the heat source analysis signal 905 is "0" indicating that no heat source is detected, and when it is determined that a heat source has moved outside the detection region of the pyroelectric array sensor. On the other hand, the heat source disappearance state signal 904 outputs "0" when it is determined that a heat source exists within the detection region of the pyroelectric array sensor. On the other hand, the heat source analysis signal 905 is "1" when a heat source exists within the detection region of the pyroelectric array sensor 501, that is, it is detected by an arbitrary pyroelectric cell of the pyroelectric array sensor 501, and is "0" when no heat source is detected.

Figure 12:
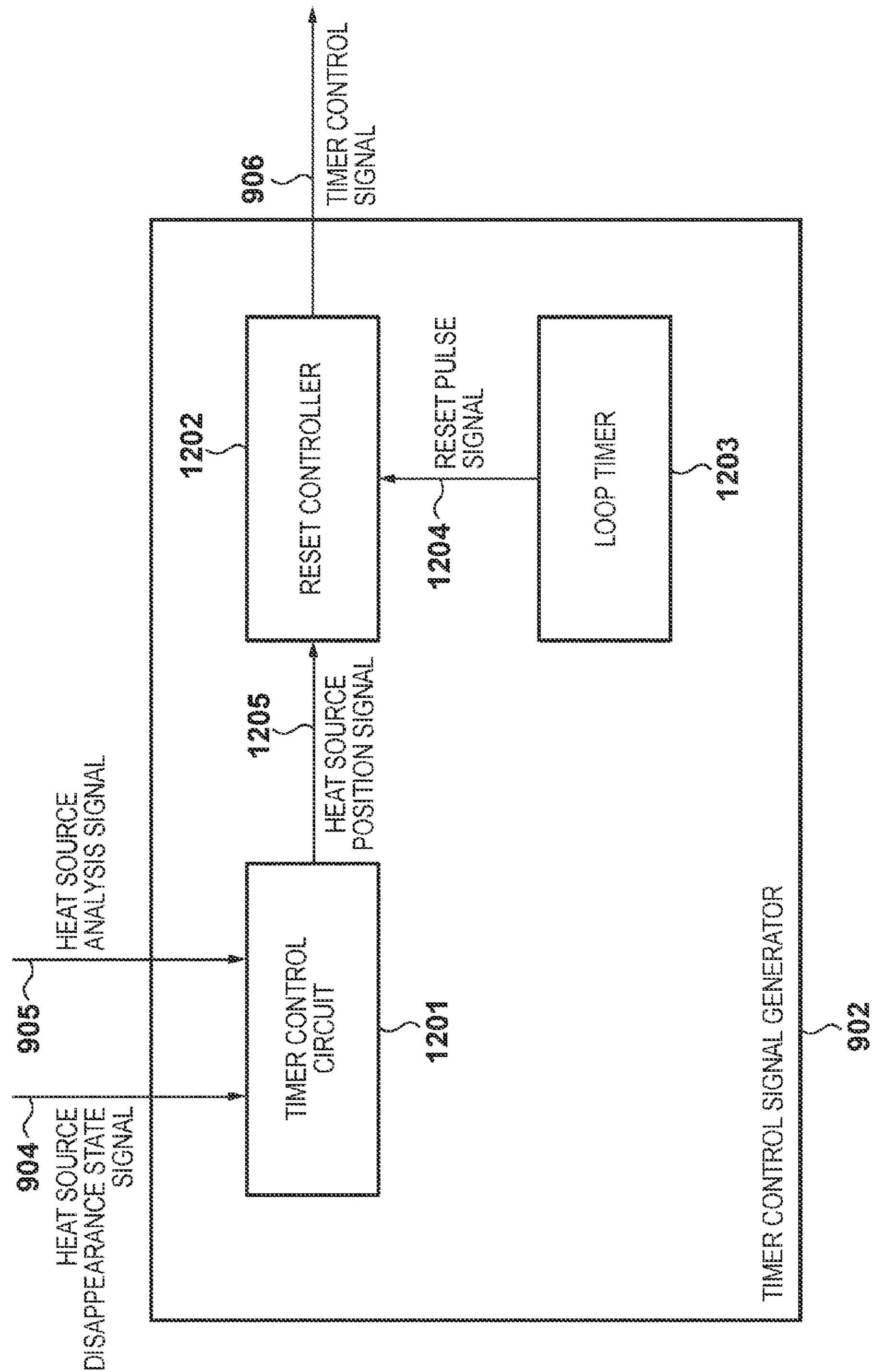
FIG. 12 is a block diagram showing the internal arrangement of a timer control signal generator.

FIG. 12 is a block diagram showing the internal arrangement of the timer control signal generator 902. The timer control signal generator 902 inputs the heat source disappearance state signal 904 and heat source analysis signal 905, and outputs the timer control signal 906. The timer control signal generator 902 includes a timer control circuit 1201, reset controller 1202, and loop timer 1203. In this embodiment, the timer control circuit 1201 inputs the heat source analysis signal 905 and heat source disappearance state signal 904 from the analysis circuit 901, and outputs a heat source position signal 1205. The timer control circuit 1201 outputs "0" as the heat source position signal 1205 when the heat source analysis signal 905 is "1". Also, the timer control circuit 1201 outputs "0" as the heat source position signal 1205 when the heat source analysis signal 905 is "0" and the heat source disappearance state signal 904 is "0". Then, the timer control circuit 1201 outputs "1" as the heat source position signal 1205 when the heat source analysis signal 905 is "0" and the heat source disappearance state signal 904 is "1". That is, when it is determined that a heat source exists within the detection region, the heat source position signal 1205 outputs "0"; when it is determined that a heat source does not exist within the detection region, it outputs "1".

The loop timer 1203 uses a count-down timer in this embodiment. The loop timer 1203 performs a count-down operation from a setting value, which is set in advance, and resets a counter to the setting value when the value becomes "0", so as to start a count-down operation of the next cycle. A reset pulse signal 1204 output from the loop timer 1203 normally assumes a value "0". However, when the value of the loop timer 1203 becomes "0", the reset pulse signal 1204 outputs "1" as a pulse signal for one cycle.

The reset controller 1202 inputs the heat source position signal 1205 and reset pulse signal 1204, and outputs the timer control signal 906. In this embodiment, when the input reset pulse signal 1204 is "1" and the heat source position signal 1205 is "1", "0" is output as the timer control signal 906. That is, when it is determined that no heat source is detected within the detection region of the pyroelectric array sensor 501, and a heat source has moved outside the detection region of the pyroelectric array sensor 501, "0" is output as the timer control signal 906. On the other hand, in other cases, "1" is output as the timer control signal 906 so as to reset a count value.

Figure 13:
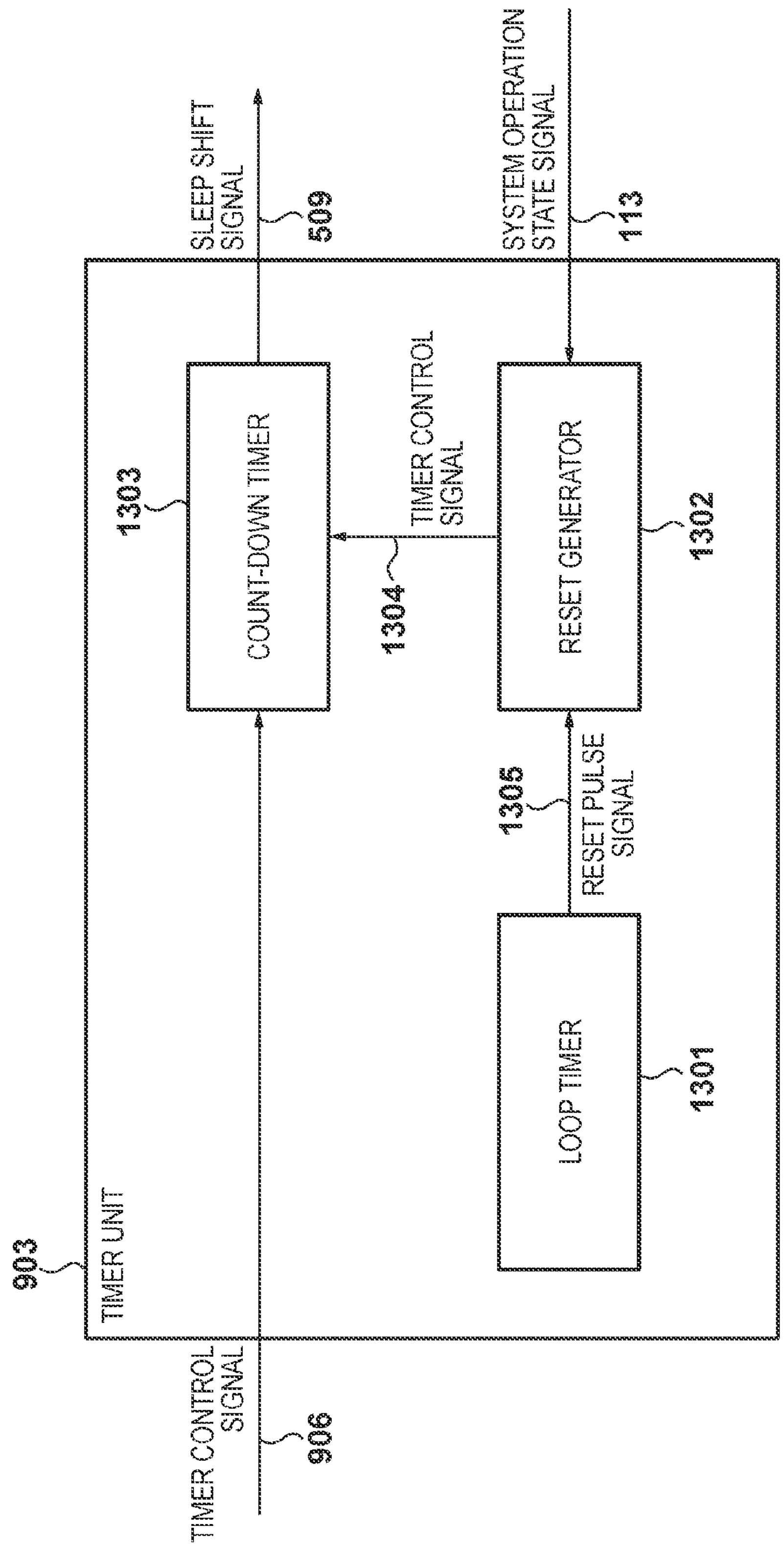
FIG. 13 is a block diagram showing the internal arrangement of a timer unit.

FIG. 13 is a block diagram showing the internal arrangement of the timer unit 903. The timer unit 903 inputs the timer control signal 906 and system operation state signal 113, and outputs the sleep shift signal 509. The timer unit 903 includes a loop timer 1301, reset generator 1302, and count-down timer 1303. The loop timer 1301 uses a count-down timer in this embodiment. The loop timer 1301 performs a count-down operation from a setting value, which is set in advance, and resets a counter to the setting value when the value becomes "0", so as to start a count-down operation of the next cycle.

A reset pulse signal 1305 output from the loop timer 1301 normally assumes a value "0", and outputs "1" as a pulse signal for one cycle when the value of the loop timer 1301 becomes "0". The reset generator 1302 inputs the system operation state signal 113 and reset pulse signal 1305, and outputs a timer control signal 1304.

In this embodiment, when the input reset pulse signal 1305 is "1" and the system operation state signal 113 is "0" (normal operation state), "1" is output as the timer control signal 1304. On the other hand, in other cases, the timer control signal 1304 outputs "0".

The count-down timer 1303 inputs the timer control signal 906 and timer control signal 1304, and outputs the sleep shift signal 509. The count-down timer 1303 uses a count-down timer in this embodiment. The count-down timer 1303 performs a count-down operation from a setting value, which is set in advance, and outputs a signal "1" having a 1-cycle width as the sleep shift signal 509 when the value becomes "0". On the other hand, in other cases, the sleep shift signal 509 outputs "0".

The count-down timer 1303 uses the timer control signal 906 and timer control signal 1304 as reset signals when it performs a count-down operation. When the timer control signal 906 is changed to "1" during the count-down operation, the count-down timer 1303 resets the count value, and starts a count-down operation again from the next cycle. Likewise, when the timer control signal 1304 is changed to "1" during the count-down operation, the count-down timer 1303 resets the count value, and starts a count-down operation again from the next cycle. That is, when the image processing apparatus 100 is operating or when the operator is making setting operations on a user interface screen of the image processing apparatus 100, the count-down timer 1303 resets a count value at a given interval in response to the timer control signal 1304. Therefore, the sleep shift signal 509 is never changed to "1". Also, when a heat source, that is, the operator exists within the detection region of the pyroelectric array sensor 501 included in the image processing apparatus 100, the count-down timer 1303 resets a count value at a given interval in response to the timer control signal 906, and the sleep shift signal 509 is never changed to "1".

On the other hand, when the count value is not reset by the above two signals, that is, when it is determined that a heat source has moved outside the detection region in a state in which the image processing apparatus 100 does not operate, and no setting inputs and the like are made, the count-down operation of the count-down timer 1303 progresses. Then, when the timer reaches "0", "1" is output as the sleep shift signal 509.

Figure 14:
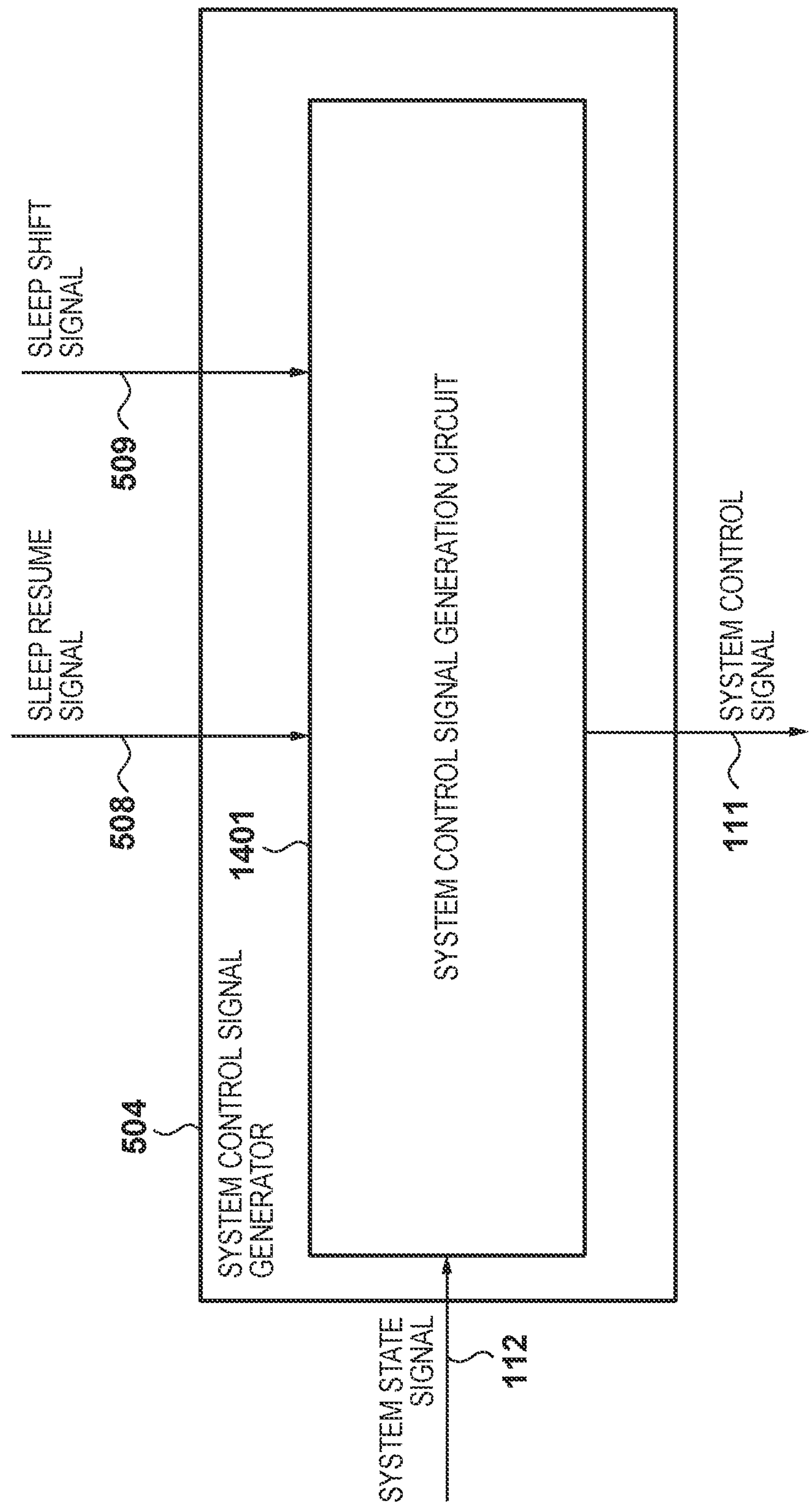
FIG. 14 is a block diagram showing the internal arrangement of a system control signal generator.

FIG. 14 is a block diagram showing the internal arrangement of the system control signal generator 504. The system control signal generator 504 inputs the sleep resume signal 508, sleep shift signal 509, and system state signal 112, and outputs the system control signal 111. The system control signal generator 504 includes a system control signal generation circuit 1401. In this embodiment, the system control signal generation circuit 1401 generates the system control signal 111 as follows.

When the sleep shift signal 509 is changed to "1" while the system state signal 112 is "0" (normal operation state), the image processing apparatus 100 is controlled to transition from the normal operation state to the power saving state. For this purpose, the system control signal 111="0" is output to the processor 101 and power supply control unit 110. On the other hand, when the sleep resume signal 508 is changed to "1" while the system state signal 112 is "1" (power saving state), the image processing apparatus 100 is controlled to transition from the power saving state to the normal operation state. For this purpose, the system control signal 111="1" is output to the processor 101 and power supply control unit 110. With the aforementioned arrangement, the image processing apparatus 100 controls transition from the power saving state to the normal operation state and vice versa.

The transition control processing from the normal operation state to the power saving state will be described below.

FIG. 15 is a flowchart showing the sequence of the transition control processing from the normal operation state to the power saving state according to this embodiment. Respective processes shown in FIG. 15 are executed, for example, when the processor 101 such as a CPU controls the respective units of the image processing apparatus 100.

In step S1501, the image processing apparatus 100 is in the normal operation state. In step S1502, a count value of the count-down timer 1303 in the timer unit 903 is reset to the setting value (count value), which is set in advance. In step S1503, the count-down timer 1303 in the timer unit 903 starts a count-down operation. The first count-down execution start timing in steps S1502 and S1503 is not particularly limited as long as a timing after the image processing apparatus 100 is activated is set.

It is determined in step S1504 whether or not the count value of the count-down timer 1303 is "0". If it is determined that the count value is "0", the sleep shift signal 509="1" is output, and the system control signal generator 504 outputs the system control signal 111="0" in step S1505. As a result, the processor 101 controls the image processing apparatus 100 to transition to the power saving state in step S1506.

If it is determined in step S1504 that the count value of the count-down timer 1303 is not "0", it is determined in step S1507 based on the system operation state signal 113 whether the image processing apparatus 100 is operating or it is in a stop state in which no operation input or the like by the operator is made. This determination is made by, for example, the sleep shift controller 503 based on the system operation state signal 113. If it is determined that the image processing apparatus 100 is in an operating state, the count value of the count-down timer 1303 in the timer unit 903 is reset to the setting value, which is set in advance, in step S1502. On the other hand, if it is determined that the image processing apparatus 100 is in a stop state, it is determined in step S1508 whether or not a heat source is detected within the detection region of the pyroelectric array sensor 501.

In step S1508, the timer control signal generator 902 in the sleep shift controller 503 determines, based on the heat source analysis signal 905, whether or not a heat source is detected within the detection region of the pyroelectric array sensor 501. In this case, if it is determined that a heat source is detected within the detection region of the pyroelectric array sensor 501, the count value of the count-down timer 1303 in the timer unit 903 is reset to the setting value, which is set in advance, in step S1502. On the other hand, if it is determined that no heat source is detected within the detection region of the pyroelectric array sensor 501, it is determined in step S1509 whether a heat source ceases to be detected within the detection region or it ceases to be detected since the heat source has moved outside the detection region.

In step S1509, the timer control signal generator 902 determines based on the heat source disappearance state signal 904 whether or not a heat source ceases to be detected within the detection region of the pyroelectric array sensor 501 or it ceases to be detected since the heat source has moved outside the detection region (an example of disappearance determination). In this case, if it is determined that a heat source ceases to be detected within the detection region of the pyroelectric array sensor 501, the count value of the count-down timer 1303 in the timer unit 903 is reset to the setting value, which is set in advance, in step S1502. On the other hand, if it is determined that a heat source ceases to be detected since it has moved outside the detection region of the pyroelectric array sensor 501, the count-down timer 1303 in the timer unit 903 continues the count-down operation in step S1503.

With the aforementioned sequence, the image processing apparatus 100 transitions from the normal operation state to the power saving state. That is, upon making transition from the normal operation state to the power saving state using the pyroelectric array sensor, when a heat source ceases to be detected by the pyroelectric array sensor since it does not make any large motion, transition to the power saving state is limited. For example, the normal operation state is maintained without setting the image processing apparatus in the power saving mode. As a result, the power consumption can be appropriately controlled without impairing the convenience of the operator.

Second Embodiment

The first embodiment has explained the arrangement in which the count-down timer in a sleep shift controller 503 is continuously reset when it is determined that the operator exists in the vicinity of an image processing apparatus 100, and when a heat source ceases to be detected within the detection region of a pyroelectric array sensor 501. With this arrangement, the image processing apparatus 100 is prevented from unwantedly transitioning to the power saving state. However, a heat source may move outside the detection region of the pyroelectric sensor 501 without being detected by a pyroelectric cell in the outermost periphery due to an arbitrary cause in some cases. In such case, the image processing apparatus 100 cannot transition to the power saving state although the operator has actually disappeared from the vicinity of the image processing apparatus 100.

In this embodiment, when a heat source ceases to be detected within the detection region of the pyroelectric array sensor 501, and when it is determined that the operator exists in the vicinity of the image processing apparatus 100, an initial value of a count-down timer 1303 is changed to be a larger setting value. That is, a longer count-down time of the count-down timer 1303, that is, a longer transition time to the power saving state is set. By setting a longer transition time, if the user really exists in the vicinity of the image processing apparatus 100, if he or she makes some motion, the count value can be reset to prevent transition to the power saving state. On the other hand, if the user really does not exist in the vicinity of the image processing apparatus 100, the image processing apparatus 100 can transition to the power saving state after an elapse of the changed transition time.

This embodiment will be described below. The same reference numerals denote the same arrangement, and modules and signals having the same functions as those in the first embodiment, and a detailed description thereof will not be repeated. The basic arrangement of this embodiment is the same as that shown in FIG. 5. This embodiment is different from the first embodiment in the sleep shift controller 503 shown in FIG. 5.

FIG. 16 is a block diagram showing the internal arrangement of a sleep shift controller 1601. The sleep shift controller 1601 is active in a normal operation state of the image processing apparatus 100. Like in the sleep shift controller 503 shown in FIG. 5, the sleep shift controller 1601 inputs a heat source detection signal 507, system state signal 112, and system operation state signal 113, and outputs a sleep shift signal 509. The sleep shift controller 1601 includes an analysis circuit 901, timer control signal generator 1602, and timer unit 1603. The analysis circuit 901 inputs the heat source detection signal 507 input from the pyroelectric array sensor 501, and outputs a heat source disappearance state signal 904 and heat source analysis signal 905. The timer control signal generator 1602 inputs the heat source disappearance state signal 904 and heat source analysis signal 905, and outputs a timer control signal 1604 as a 2-bit signal. The timer unit 1603 inputs the timer control signal 1604, and outputs a sleep shift signal 509.

The units included in the sleep shift controller 1601 will be described below, but since the analysis circuit 901 has the same arrangement and functions as those in the first embodiment, a description thereof will not be repeated.

Figure 17:
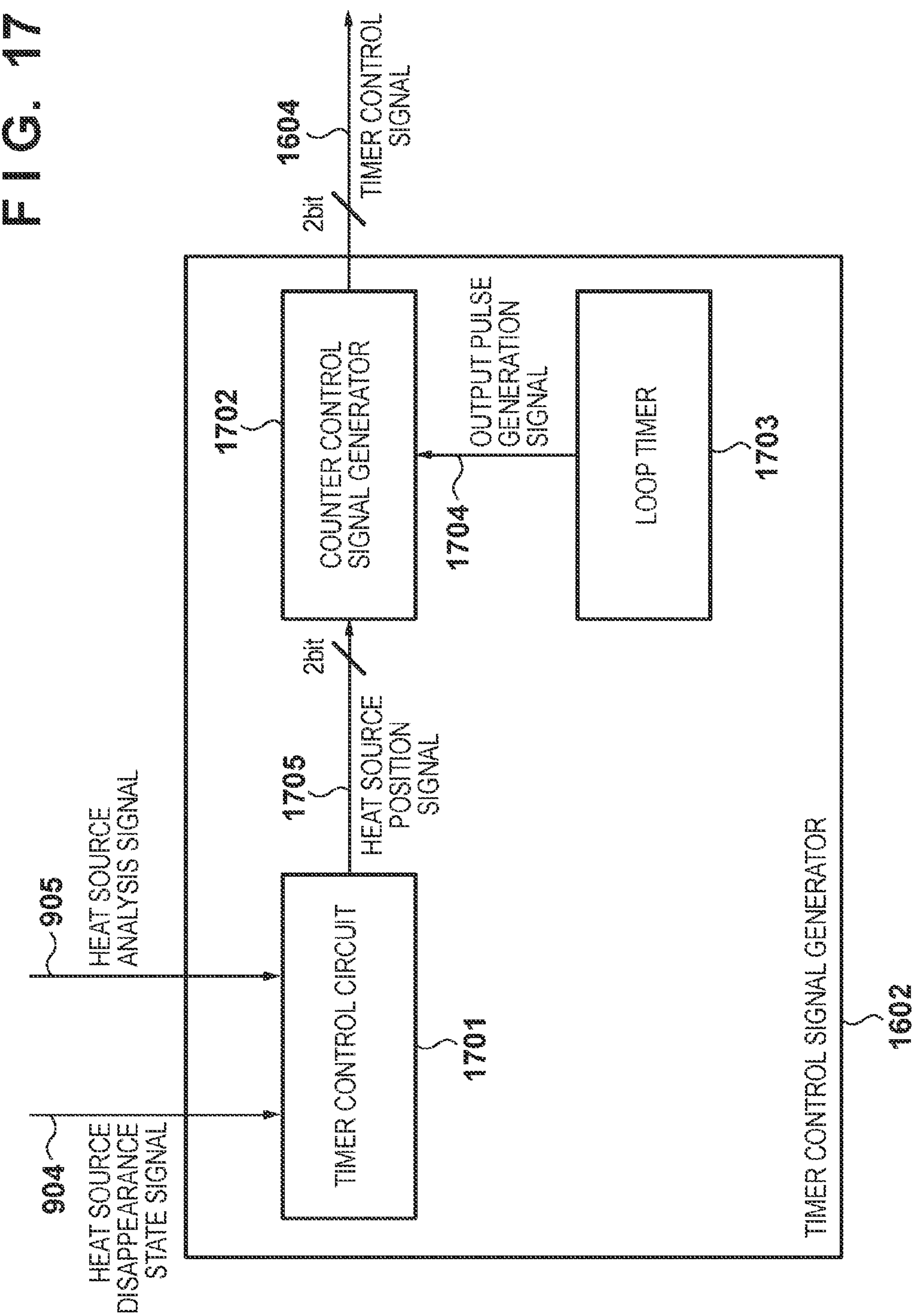
FIG. 17 is a block diagram showing the internal arrangement of a timer control signal generator.

FIG. 17 is a block diagram showing the internal arrangement of the timer control signal generator 1602. The timer control signal generator 1602 inputs the heat source disappearance state signal 904 and heat source analysis signal 905, and outputs the timer control signal 1604. The timer control signal generator 1602 includes a timer control circuit 1701, counter control signal generator 1702, and loop timer 1703. In this embodiment, the timer control circuit 1701 inputs the heat source analysis signal 905 and heat source disappearance state signal 904 input from the analysis circuit 901, and outputs a heat source position signal 1705 as a 2-bit signal.

When the heat source analysis signal 905 is "1" (a heat source is detected within the detection region), the timer control circuit 1701 outputs "00" or "11" as the heat source position signal 1705. On the other hand, when the heat source analysis signal 905 is "0" (no heat source is detected within the detection region), and when the heat source disappearance state signal 904 is "0" (it is determined that the heat source exists within the detection region), the timer control circuit 1701 outputs "01" as the heat source position signal 1705. Then, when the heat source analysis signal 905 is "0", and when the heat source disappearance state signal 904 is "1" (it is determined that the heat source has moved outside the detection region), the timer control circuit 1701 outputs "10" as the heat source position signal 1705.

The loop timer 1703 uses a count-down timer in this embodiment. The loop timer 1703 performs a count-down operation from a setting value, which is set in advance, and resets a counter to the setting value when the value becomes "0", so as to continue a count-down operation. An output pulse generation signal 1704 output from the loop timer 1703 normally assumes a value "0", but when the value of the loop timer 1703 becomes "0", "1" is output as a pulse signal for one cycle.

The counter control signal generator 1702 inputs the heat source position signal 1705 and output pulse generation signal 1704, and outputs the timer control signal 1604. When the input output pulse generation signal 1704 is changed to "1", and when the heat source position signal 1705 is "00" or "11", the counter control signal generator 1702 outputs "00" or "11" as the timer control signal 1604 to have a 1-cycle width. On the other hand, when the input output pulse generation signal 1704 is changed to "1", and when the heat source position signal 1705 is "01", the counter control signal generator 1702 outputs "01" as the timer control signal 1604 to have a 1-cycle width. Then, when the input output pulse generation signal 1704 is changed to "1", and when the heat source position signal 1705 is "10", the counter control signal generator 1702 outputs "10" as the timer control signal 1604 to have a 1-cycle width.

FIG. 18 is a block diagram showing the internal arrangement of the timer unit 1603. The timer unit 1603 inputs the timer control signal 1604 and system operation state signal 113, and outputs the sleep shift signal 509. The timer unit 1603 includes a loop timer 1801, reset generator 1802, and count-down timer 1803. The loop timer 1801 uses a count-down timer in this embodiment. The loop timer 1801 performs a count-down operation from a setting value, which is set in advance, and resets a counter to the setting value when the value becomes "0", so as to continue a count-down operation. A reset pulse signal 1805 output from the loop timer 1801 normally assumes a value "0", but when the value of the loop timer 1801 becomes "0", "1" is output as a pulse signal for one cycle.

The reset generator 1802 inputs the system operation state signal 113 and reset pulse signal 1805, and outputs a timer control signal 1804. In this embodiment, when the input reset pulse signal 1805 is changed to "1", and when the system operation state signal 113 is "0" (operation state), the reset generator 1802 outputs "1" as the timer control signal 1804. On the other hand, in other cases, the reset generator 1802 outputs "0" as the timer control signal 1804.

The count-down timer 1803 inputs the timer control signal 1804 and timer control signal 1604, and outputs the sleep shift signal 509. The count-down timer 1803 uses a count-down timer in this embodiment. The count-down timer 1803 performs a count-down operation from a setting value, which is set in advance, and outputs "1" as a signal for a 1-cycle width as the sleep shift signal 509 when the value becomes "0". On the other hand, in other cases, the count-down timer 1803 outputs "0" as the sleep shift signal 509.

The count-down timer 1803 uses the timer control signal 1804 and timer control signal 1604 as reset signals when it performs a count-down operation. That is, when the timer control signal 1804 is changed to "1" during the count-down operation, the count-down timer 1803 resets a count value to the setting value, which is set in advance, and restarts a count-down operation from the next cycle. Also, when the timer control signal 1604 is changed to "00" or "11" during the count-down operation, the count-down timer 1803 resets a count value to the setting value, which is set in advance, and starts a count-down operation from the next cycle. That is, in the above case, the sleep shift signal 509 is changed to "1" within the setting value (first count time), which is set in advance in the count-down timer 1803, thus transitioning to the power saving state.

The timer control signal 1604 is changed to "01" during the count-down operation when a heat source is not detected within the detection region of the pyroelectric array sensor but it is determined that the heat source exists within the detection region. In this case, a setting value (second count time) longer than the first count time is set in the count-down timer 1803 to start a count-down operation from the next cycle. As a result, the sleep shift signal 509 is changed to "1" after an elapse of the second count time longer than the first count time. Therefore, if a heat source is not detected by a pyroelectric cell of the outermost periphery, and moves outside the detection region of the pyroelectric array sensor 501, the image processing apparatus 100 can transition to the power saving state after an elapse of the second count time.

When the operator makes a large motion during the second count time, the pyroelectric array sensor 501 may detect the heat source again. In this case, since the timer control signal 1604 is changed to "00" or "11", the count-down timer 1803 resets a count value to the first count time, and restarts a count-down operation from the next cycle.

When the timer control signal 1604 is changed to "10", that is, when a heat source is not detected within the detection region of the pyroelectric array sensor 501, and it is determined that the heat source moves outside the detection region of the pyroelectric array sensor, the count-down timer 1803 continues the count-down operation without resetting the count value or changing the setting value. For this reason, when the heat source has moved outside the detection region of the pyroelectric array sensor 501 while the image processing apparatus 100 neither is operated nor accepts an operation input, the count-down operation of the count-down timer 1803 continues. Then, when the count value reaches "0", "1" is output as the sleep shift signal 509.

Since the system control signal generator 504 has the same arrangement and functions as those in the first embodiment, a description thereof will not be repeated.

As described above, according to this embodiment, since the setting of the initial value of the count-down timer is changed, when a heat source ceases to be detected by the pyroelectric array sensor 501 and when it is determined that the operator exists in the vicinity of the image processing apparatus 100, the transition time to the power saving state is extended. As a result, even when the heat source is not detected by the pyroelectric cell of the outermost periphery due to an arbitrary cause and has moved outside the detection region, the image processing apparatus 100 can transition to the power saving state after an elapse of the re-set time. On the other hand, when the heat source makes a large motion within the extended count time (second count time), the count value is reset to the normal setting value again, and the transition processing to the power saving state as in the first embodiment is executed.

The transition control processing from the normal operation state to the power saving state according to this embodiment will be described below.

FIG. 19 is a flowchart showing the sequence of the transition control processing from the normal operation state to the power saving state according to this embodiment. Respective processes shown in FIG. 19 are executed, for example, when a processor 101 such as a CPU controls the respective units of the image processing apparatus 100.

In step S1901, the image processing apparatus 100 is in the normal operation state. In step S1902, a count value of the count-down timer 1803 in the timer unit 1603 is reset to the setting value (first count time), which is set in advance. In step S1903, the count-down timer 1803 in the timer unit 1603 starts a count-down operation.

If the count value of the count-down timer 1803 is "0" in step S1904, the sleep shift controller 1601 outputs the sleep shift signal 509="1" in step S1905. As a result, the system control signal generator 504 outputs the system control signal 111="0". Then, in step S1906, the image processing apparatus 100 transitions to the power saving state under the control of the processor 101.

If the count value of the count-down timer 1803 is not "0" in step S1904, the operation state of the image processing apparatus 100 is determined in step S1907. In step S1907, the sleep shift controller 1601 determines based on the system operation state signal 113 whether the image processing apparatus 100 is operating or it is in a stop state in which no operation input or the like is made. In this case, if it is determined that the image processing apparatus 100 is in the operation state, the count value of the count-down timer 1803 in the timer unit 1603 is reset to the setting value (first count time), which is set in advance, in step S1902. On the other hand, if it is determined that the image processing apparatus 100 is in the stop state, it is determined in step S1908 whether or not a heat source is detected within the detection region of the pyroelectric array sensor 501.

In step S1908, the timer control signal generator 1602 determines based on the heat source analysis signal 905 whether or not the heat source is detected within the detection region of the pyroelectric array sensor 501. If it is determined that the heat source is detected within the detection region of the pyroelectric array sensor 501, the count value of the count-down timer 1803 is reset to the setting value (first count time), which is set in advance, in step S1902.

On the other hand, if it is determined that no heat source is detected within the detection region of the pyroelectric array sensor 501, it is determined in step S1909 whether the heat source ceases to be detected within the detection region or it ceases to be detected since the heat source has moved outside the detection region. In step S1909, the timer control signal generator 1602 determines based on the heat source disappearance state signal 904 whether the heat source ceases to be detected within the detection region or it ceases to be detected since the heat source has moved outside the detection region.

If it is determined that the heat source ceases to be detected since it has moved outside the detection region, the count-down operation of the first count time by the count-down timer 1803 is continued in step S1903. On the other hand, if it is determined that the heat source ceases to be detected within the detection region, the setting value of the count-down timer 1803 is changed to the second count time longer than the first count time in step S1910. Then, the count-down timer 1803 starts a count-down operation of the second count time in step S1903.

As described above, since the setting of the initial value of the count-down timer is changed, when a heat source ceases to be detected by the pyroelectric array sensor 501 and when it is determined that the operator exists in the vicinity of the image processing apparatus 100, the transition time to the power saving state can be extended. As a result, even when the heat source is not detected by the pyroelectric cell of the outermost periphery due to an arbitrary cause and has moved outside the detection region of the pyroelectric sensor 501, the image processing apparatus 100 can transition to the power saving state after an elapse of the re-set second count time. When the heat source makes a large motion within the extended count time (second count time), the count value is reset to the normal setting value (first count time) again, and the transition control to the power saving state is executed.

In addition to the first and second embodiments, when it is determined in step S1509 or S1909 that the heat source ceases to be detected since it has moved outside the detection region, error determination as to whether or not an error such as paper jam has occurred in the image processing apparatus 100 may be added. Then, when it is determined that an error has occurred, the process returns to step S1502 or S1902 to reset the count value. On the other hand, when it is determined that no error has occurred, the process returns to step S1503 or S1903 to continue the count-down operation.

With this arrangement, for example, when paper jam has occurred, and when the operator moves away from the image processing apparatus 100 to bring print sheets, the image processing apparatus 100 can be prevented from transitioning to the power saving state.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-047136, filed Mar. 8, 2013, which is hereby incorporated by reference herein in its entirety.

What is claimed is:

1. An image processing apparatus, which operates in a first power state and a second power state different from the first power state, comprising:

a pyroelectric sensor configured to detect a heat source within a detection region of said pyroelectric sensor;

a determination unit configured to, in a case where said pyroelectric sensor does not detect the heat source after said pyroelectric sensor detected the heat source in the detection region, determine whether or not the heat source has moved outside the detection region based on a position in the detection region at which said pyroelectric sensor last detected the heat source; and a power control unit configured to control, in a case where said determination unit determines that the heat source has moved outside the detection region, the image processing apparatus to change from the first power state to the second power state, and to stay in the first power state, in a case where said determination unit determines that the heat source has not moved outside the detection region.

2. The apparatus according to claim 1, wherein said pyroelectric sensor is an array sensor having a plurality of pyroelectric cells used to detect the heat source within the detection region, and said determination unit determines whether or not the heat source has moved outside the detection region based on a detection result of a pyroelectric cell used to detect the heat source existed in an outer edge of the detection region.

3. The apparatus according to claim 2, wherein said pyroelectric sensor has the plurality of pyroelectric cells arranged in a matrix pattern or a linear pattern.

4. The apparatus according to claim 1, further comprising:

a timer control unit configured to, in a case where said determination unit determines that the heat source has moved outside the detection region, set to a timer a first time for changing from the first power state to the second power state, and in a case where said determination unit determines that the heat source has not moved outside the detection region, set to the timer a second time longer than the first time for changing from the first power state to the second power state, and wherein said power control unit controls the image processing apparatus to change from the first power state to the second power state after the first time or the second time set by said timer control unit elapses.

5. The apparatus according to claim 1, further comprising an error determination unit configured to determine whether or not an error has occurred in the image processing apparatus, wherein in a case where said error determination unit determines that no error has occurred, and in a case where said determination unit determines that the heat source has moved outside the detection region, said power control unit controls the image processing apparatus to change from the first power state to the second power state.

6. The apparatus according to claim 5, wherein in a case where said error determination unit determines that an error has occurred, said control unit inhibits the image processing apparatus from changing from the first power state to the second power state.

7. The apparatus according to claim 4, wherein in a case where said pyroelectric sensor detects the heat source in the detection region while the timer counts the second time set by said timer control unit, said timer control unit sets the first time to the timer.

8. The apparatus according to claim 1, wherein the second power state is a power state which needs a less power than that of the first power state.

9. The apparatus according to claim 1, wherein the heat source is a user.

10. A control method executed in an image processing apparatus, which comprises a pyroelectric sensor configured to detect a heat source within a detection region of said pyroelectric sensor, and operates in a first power state and a second power state different from the first power state, the method comprising:

a determination step of, in a case where said pyroelectric sensor does not detect the heat source after said pyroelectric sensor detected the heat source in the detection region, determining whether or not the heat source has moved outside the detection region based on a position in the detection region at which said pyroelectric sensor last detected the heat source; and a power control step of controlling, in a case where it is determined in the determination step that the heat source has moved outside the detection region, the image processing apparatus to change from the first power state to the second power state, and staying in the first power state, in a case where it is determined in the determination step that the heat source has not moved outside the detection region.

* * * * *